US011435572B2

(12) United States Patent
Yeoh et al.

(10) Patent No.: US 11,435,572 B2
(45) Date of Patent: Sep. 6, 2022

(54) METHOD AND SYSTEM FOR LARGE FIELD OF VIEW DISPLAY WITH SCANNING REFLECTOR

(71) Applicant: Magic Leap, Inc., Plantation, FL (US)

(72) Inventors: Ivan Li-Chuen Yeoh, Fort Lauderdale, FL (US); Lionel Ernest Edwin, Plantation, FL (US); Barak Freedman, Binyamina (IL); Vaibhav Mathur, Weston, FL (US); Xiaoyang Zhang, Alviso, CA (US); Timothy Mark Dalrymple, Gainesville, FL (US); Clinton Carlisle, Parkland, FL (US); Chulwoo Oh, Cedar Park, TX (US); Philip Premysler, Davie, FL (US)

(73) Assignee: Magic Leap, Inc., Plantation, FL (US)

( * ) Notice: Subject to any disclaimer, the term of this patent is extended or adjusted under 35 U.S.C. 154(b) by 603 days.

(21) Appl. No.: 15/796,669

(22) Filed: Oct. 27, 2017

(65) Prior Publication Data
US 2018/0120559 A1 May 3, 2018

Related U.S. Application Data

(60) Provisional application No. 62/545,243, filed on Aug. 14, 2017, provisional application No. 62/532,968, (Continued)

(51) Int. Cl.
G02B 26/12 (2006.01)
G02B 5/30 (2006.01)
(Continued)

(52) U.S. Cl.
CPC ............ G02B 26/123 (2013.01); G02B 5/18 (2013.01); G02B 5/1842 (2013.01);
(Continued)

(58) Field of Classification Search
None
See application file for complete search history.

(56) References Cited

U.S. PATENT DOCUMENTS 5,889,567 A * 3/1999 Swanson ................ H04N 9/315
349/62
7,252,394 B1 8/2007 Fu
(Continued)

FOREIGN PATENT DOCUMENTS

AU 2017350941 A1 4/2019
CA 3042042 A1 5/2018
(Continued)

OTHER PUBLICATIONS

PCT/US2017/058868, "International Search Report and Written Opinion", dated Jan. 18, 2018, 10 pages.
(Continued)

Primary Examiner — Christopher Stanford
Assistant Examiner — Journey F Sumlar
(74) Attorney, Agent, or Firm — Kilpatrick Townsend & Stockton LLP

(57) ABSTRACT

An image display system includes an optical subsystem configured to emit a first light beam and a second light beam, wherein the first light beam illuminates a first portion of a composite field of view and the second beam illuminates a second portion of the composite field of view. A scanning mirror is positioned to intercept and reflect the first light beam and the second light beam. The system also has a waveguide with at least one input coupling optical element for receiving the first light beam and the second light beam into the waveguide. The waveguide also has an output coupling optical element for projecting a plurality of output
(Continued)

light beams derived from the first light beam and the second light beam from the waveguide to illuminate the composite field of view.

20 Claims, 25 Drawing Sheets

Related U.S. Application Data filed on Jul. 14, 2017, provisional application No. 62/414,484, filed on Oct. 28, 2016.

(51) Int. Cl.

| | | |
|---|---|---|
| *G02B 5/18* | (2006.01) | |
| *G02B 26/10* | (2006.01) | |
| *F21V 8/00* | (2006.01) | |
| *G02B 26/08* | (2006.01) | |
| *G02B 27/01* | (2006.01) | |
| *G02B 27/10* | (2006.01) | |
| *G02B 27/28* | (2006.01) | |

(52) U.S. Cl.
CPC ......... *G02B 5/3083* (2013.01); *G02B 6/0016* (2013.01); *G02B 6/0038* (2013.01); *G02B 26/0833* (2013.01); *G02B 26/103* (2013.01); *G02B 26/105* (2013.01); *G02B 26/129* (2013.01); *G02B 27/0172* (2013.01); *G02B 27/1026* (2013.01); *G02B 27/286* (2013.01); *G02B 2027/0123* (2013.01)

(56) References Cited

U.S. PATENT DOCUMENTS

| | | | | |
|---|---|---|---|---|
| 7,986,315 B2* | 7/2011 | Sprague | ............... | G02B 27/104 |
| | | | | 345/204 |
| 2002/0024708 A1 | 2/2002 | Lewis et al. | | |
| 2002/0145042 A1* | 10/2002 | Knowles | ............ | G02B 19/0057 |
| | | | | 235/462.01 |
| 2004/0263943 A1 | 12/2004 | Starkweather | | |
| 2006/0139714 A1 | 6/2006 | Gruhlke et al. | | |
| 2010/0079865 A1 | 4/2010 | Saarikko et al. | | |
| 2010/0149073 A1 | 6/2010 | Chaum et al. | | |
| 2010/0201953 A1 | 8/2010 | Freeman et al. | | |
| 2013/0300999 A1* | 11/2013 | DeJong | ................ | G02B 27/017 |
| | | | | 351/158 |
| 2015/0268415 A1 | 9/2015 | Schowengerdt et al. | | |
| 2016/0094818 A1* | 3/2016 | Okamoto | ............. | G02B 26/123 |
| | | | | 348/196 |
| 2017/0322418 A1 | 11/2017 | Lin et al. | | |
| 2019/0121126 A1* | 4/2019 | Simmonds | ............... | G02B 5/18 |

FOREIGN PATENT DOCUMENTS

| | | | |
|---|---|---|---|
| CN | 103458252 | A | 12/2013 |
| CN | 104303091 | A | 1/2015 |
| CN | 104813218 | A | 7/2015 |
| CN | 105467586 | A | 4/2016 |
| CN | 105741449 | A | 7/2016 |
| CN | 110168419 | A | 8/2019 |
| EP | 1203968 | A1 | 5/2002 |
| EP | 2669842 | A1 | 12/2013 |
| EP | 3532881 | A1 | 9/2019 |
| EP | 3532881 | A4 | 11/2019 |
| IN | 201947016568 | A | 5/2019 |
| JP | 2006350257 | A | 12/2006 |
| JP | 2009516862 | A | 4/2009 |
| JP | 2019534478 | A | 11/2019 |
| KR | 20190066075 | A | 6/2019 |
| WO | 2015125794 | A1 | 8/2015 |
| WO | 2016059177 | A1 | 4/2016 |
| WO | 2016113533 | A2 | 7/2016 |
| WO | 2018081636 | A | 5/2019 |

OTHER PUBLICATIONS

EP17864673.3, "Extended European Search Report", dated Oct. 16, 2019, 10 pages.
Chinese Application No. 201780067206.8, Office Action dated Mar. 4, 2021, 5 pages (3 pages of Original Document and 2 pages of English Translation).
European Application No. 17864673.3, Office Action dated Feb. 4, 2021, 6 pages.
Chinese Application No. 201780067206.8, Office Action dated May 25, 2020, 12 pages (8 pages of Original Document and 4 pages of English Translation).
International Application No. PCT/US2017/058868, International Preliminary Report on Patentability dated May 9, 2019, 9 pages.
AU2017350941, "First Examination Report", dated Nov. 15, 2021, 5 pages.
Application No. EP 19766933.6, Extended European Search Report, dated Dec. 10, 2021, 12 pages.
IN201947016568, "First Examination Report", dated Dec. 8, 2021, 5 pages.
Application No. JP2019-522806, Office Action and English Translation, dated Apr. 6, 2022, 6 pages.

* cited by examiner

METHOD AND SYSTEM FOR LARGE FIELD OF VIEW DISPLAY WITH SCANNING REFLECTOR

CROSS-REFERENCES TO RELATED APPLICATIONS

This Application claims priority to U.S. Provisional Patent Application No. 62/414,484, filed on Oct. 28, 2016, U.S. Provisional Patent Application No. 62/532,968, filed on Jul. 14, 2017, and U.S. Provisional Patent Application No. 62/545,243, filed on Aug. 14, 2017, the contents of all of which are hereby incorporated by reference in their entirety for all purposes.

BACKGROUND OF THE INVENTION

Modern computing and display technologies have facilitated the development of systems for so-called "virtual reality" or "augmented reality" experiences, wherein digitally produced images or portions thereof are presented in a wearable device to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

The wearable device may include augmented and/or virtual reality glasses. The image can be displayed using image frames or raster scanned images. In a scanning image display system, each of the light beams defines the pixels of the image. By scanning the mirrors in two orthogonal axes, a two-dimensional field of view (FOV) can be created. The images can be projected onto the spectacle lens, which can include waveguide-based eyepieces and other optical elements, such as optical fibers. The image display systems can be mounted on each of the left and right side the glasses frames.

SUMMARY OF THE INVENTION

Conventional scanning image displays in a wearable device for virtual reality or augmented reality applications often have limited field of view, because the scanning mirror has limited range of scan motion and design constraints in the arrangement of optical elements. However, this arrangement can lead to a larger device size, which can be undesirable. Embodiments of the present invention provide scanning image display systems with large field of view while maintaining a small device form factor. In some embodiments, the larger field of view can be achieved by scanning multiple incoming light beams at the same time and combining the individual fields of view into a larger composite field of view.

Embodiments of the present invention relate generally to image display systems. According to some embodiments of the invention, an image display system includes a scanning mirror for receiving two or more incoming light beams and providing a plurality of reflected light beams. Each of the plurality of reflected light beams is configured to provide an image in a respective field of view. The image display system also includes a waveguide having an input coupling optical element and an output coupling optical element. The input coupling optical element is configured for coupling the plurality of reflected light beams into the waveguide. The output coupling optical element is configured for projecting a plurality of output light beams from the waveguide to form a projected image in a composite field of view.

According to some embodiments of the invention, an image display system includes an optical subsystem configured to emit a first light beam and a second light beam, wherein the first light beam illuminates a first portion of a composite field of view and the second beam illuminates a second portion of the composite field of view. A scanning mirror is positioned to intercept and reflect the first light beam and the second light beam. The system also has a waveguide with at least one input coupling optical element for receiving the first light beam and the second light beam into the waveguide. The waveguide also has an output coupling optical element for projecting a plurality of output light beams derived from the first light beam and the second light beam from the waveguide to illuminate the composite field of view.

In some embodiments, the image display system also includes two or more RGB (Red-Blue-Green) combiners disposed on an opposite side of the waveguide from the scanning mirror. The RGB combiners are configured to provide the two or more incoming light beams having different incident angles. The input coupling optical element is configured to allow the incoming light beams to pass through the waveguide to reach the scanning mirror. The input coupling optical element is also configured to couple the reflected light beams into the waveguide.

In some embodiments of the image display system, the two or more RGB combiners are disposed at different angles with respect to the scanning mirror to provide the two or more incoming light beams having different incident angles.

In alternative embodiments, the two or more RGB combiners are disposed at the same angle with respect to the scanning mirror, and the image display system further includes reflective optical elements to provide two or more light beams having different incident angles.

In some embodiments, the input coupling optical element is a polarization sensitive diffractive input coupling grating (ICG).

In some embodiments, the image display system also includes a polarization control element disposed between the scanning mirror and the waveguide to convert the incoming beam to a polarization for which the incoupling element is transmissive.

In some embodiments, the image display system also includes a polarization control element disposed between the waveguide and the two or more RGB combiners. The polarization element is configured to convert the incoming light beams to a first polarization state, and the scanning mirror is configured to convert the first circular polarization state to a second circular polarization state. The polarization sensitive input coupling optical element is configured to allow light of the first circular polarization state to pass through and is configured to couple light of the second circular polarization state into the waveguide.

In some embodiments, the image display system also includes two or more RGB combiners disposed on the same side as the waveguide relative the scanning mirror. The two or more RGB combiners provide the two or more incoming light beams having different incident angles. The image display system also includes a quarter wave plate disposed adjacent to the scanning mirror and a polarization sensitive beam splitter disposed between the quarter wave plate and the waveguide. The polarization sensitive beam splitter is configured to direct the two or more incoming light beams from the RGB combiners through the quarter wave plate towards the scanning mirror, and light beams reflected from the scanning mirror are configured to propagate through the quarter wave plate and the polarization sensitive beam splitter and coupled into the waveguide by the input coupling optical element.

According to some embodiments of the invention, an image display system includes a source of imagewise modulated light that outputs a collimated incoming light beam including multiple components differentiated by wavelength and/or polarization. The image display system also includes a scanning mirror with a diffractive surface for receiving the collimated incoming light beam and by diffraction angularly separating the beam components. Each of the plurality of reflected and diffracted beam components is configured to provide an image in a respective field of view. The image display system also includes a waveguide that has an input coupling optical element for coupling the plurality of reflected light beams into the waveguide, and an output coupling optical element for projecting a plurality of output light beams from the waveguide to form a projected image with a composite field of view.

According to some embodiments of the invention, an image display system includes a light source for providing a collimated incoming light beam, the collimated incoming light beam including multiple components. The system also includes a scanning mirror with a diffractive surface for receiving the collimated incoming light beam and for providing a plurality of reflectively diffracted light beams having different angles of diffraction. Each of the plurality of reflectively diffracted light beams is configured to illuminate a portion of a field of view (FOV). The system also includes a waveguide having an input coupling optical element for receiving the plurality of reflectively diffracted light beams into the waveguide, and an output coupling optical element for projecting a plurality of output light beams from the waveguide to form a projected image with a composite field of view (FOV). The plurality of output light beams is derived within the waveguide from the plurality of reflectively diffracted light beams.

In an embodiment of the above image display system, the multiple components can include components having different wavelengths. In another embodiment, the multiple components can include components having different polarization. In yet another embodiment, the multiple components can include a plurality of sets of red, green, and blue components.

In an embodiment of the above image display system, the input coupling optical element is polarization state selective.

In another embodiment, the scanning mirror is disposed on an opposite side from the light source with respect to the waveguide, and the input coupling optical element of the waveguide is configured to allow the collimated incoming light beam to pass through the input coupling element and the waveguide. The input coupling optical element is also configured to couple the plurality of reflectively diffracted light beams into the waveguide by diffracting the reflectively diffracted beam at an angle above a critical angle for the waveguide.

According to some embodiments of the invention, a method for providing a composite field of view includes directing at least two input light beams to a scanning mirror, and reflecting the at least two input light beams with the scanning mirror to provide at least two reflected beams. Each of the reflected beams provides a portion of the composite field of view. The method also includes receiving the at least two reflected beams in an eyepiece waveguide, and outputting a plurality of output light beams from the eyepiece waveguide to form a projected image in the composite field of view. The plurality of output light beams are derived from the at least two reflected light beams.

In an embodiment of the above method, the method also includes providing at least two Red-Blue-Green combiners disposed on an opposite side of the eyepiece waveguide from the scanning mirror and configured to direct the at least two input light beams at different incident angles on the scanning mirror. In this embodiment, directing the at least two input light beams to the scanning mirror includes directing the at least two light beams through the waveguide eyepiece.

In another embodiment, the method includes providing an input coupling optic element on the eyepiece waveguide. In this embodiment, directing the at least two input light beams to the scanning mirror includes directing the at least two light beams through the input coupling element. Receiving the at least two reflected beams in the eyepiece waveguide includes receiving the at least two reflected beams through the input coupling element.

In some embodiments, directing at least two input light beams to a scanning mirror includes reflecting at least one of the at least two input light beams to introduce an angular difference between the at least two input light beams.

In another embodiment, directing at least two input light beams to a scanning mirror comprises passing the at least two input light beams through a quarter wave plate.

According to some embodiments of the invention, a method for displaying an image includes impinging two or more input light beams on a scanning mirror at two or more angles. The method includes scanning the two or more input light beams to provide a plurality of reflected light beams. Each of the plurality of reflected light beams is configured to provide an image in a respective field of view (FOV). The plurality of reflected light beams is received in a waveguide, and the waveguide projects a plurality of output light beams from the waveguide to form a projected image in a composite field of view (FOV). In some embodiments of the method, the composite field of view is larger than the FOV provided by each of the two or more input light beams. The image in the composite FOV can be a tiled image including the images from each of the input light beams.

Additional features, benefits, and embodiments are described below in the detailed description, figures, and claims.

DETAILED DESCRIPTION OF THE INVENTION

Embodiments of the present invention are directed to image display systems and methods for a wearable device that can provide a larger field of view (FOV) than conventional display systems.

Figure 1:
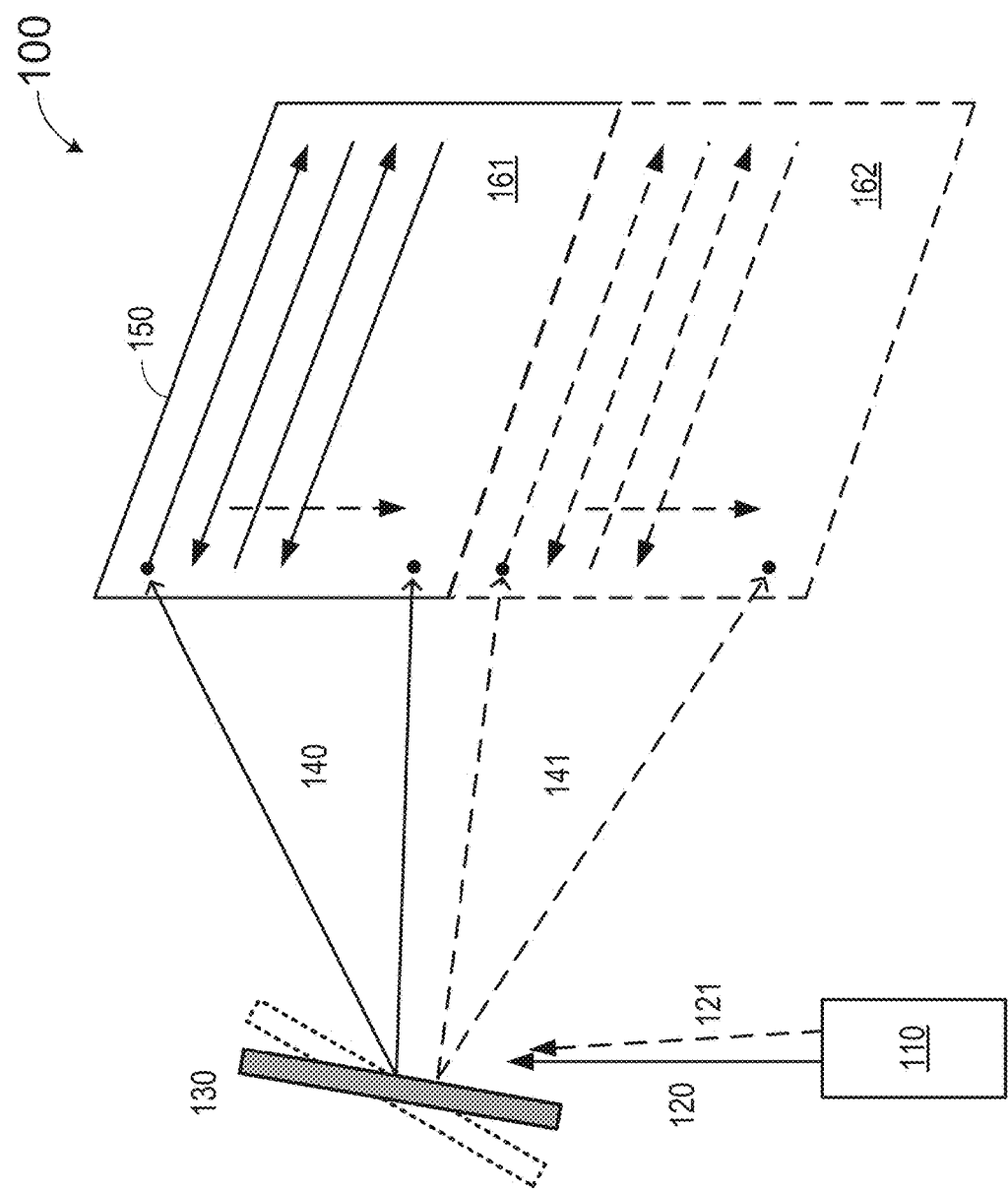
FIG. 1 is a simplified schematic diagram illustrating an image display system according to some embodiments of the present invention.

FIG. 1 is a simplified schematic diagram illustrating an image display system according to some embodiments of the present invention. In this example, the image display system 100 is a scanning display system including a scanning mirror that projects an image. Image display system 100 can be part of an eyepiece, e. g., a waveguide based eyepiece, in a wearable device. As shown in FIG. 1, image display system 100 includes a light source 110 and a scanning mirror 130 configured to form a raster scan image. Light source 110 can emit light that is imagewise modulated based on image data to form imagewise modulated light. Light source 110 is configured to emit light beams, e.g., beam 120, toward scanning mirror 130, which is configured to scan the reflected light 140 across a surface 150 to project an image. For example, reflected light beam 140 is scanned across the surface 150 in two dimensions, e.g., in the X and Y directions to form an image or to project an image onto the surface 150. Surface 150 can be a surface for displaying the image or a virtual projection surface. For simplicity, other components are not shown in FIG. 1, for example, a control system and lens systems, etc.

In some embodiments, the light beams are imagewise modulated by adjusting the intensity of each color component of the light beam during each of a succession of time periods to a value that is based on a pixel color component value of a particular pixel in a succession of pixels. Each of the succession of pixels has corresponding angular coordinate (analogous to Cartesian coordinates of pixels an LCD display panel). Simultaneously, while the imagewise light modulated beam is being modulated based on particular pixel color component values, the beam is deflected to the angular coordinates of the pixel. The light will emerge from the eyepiece and propagate towards the user's eye at an angle based on the angular coordinates.

In some embodiments of the present invention, light source 110 is configured to provide two or more light beams, e. g., beams 120 and 121, at different incident angles. The second incident light beam 121 and reflected light beam 141 are shown in broken lines. In this case, image display system 100 is configured to provide a first image in a first field of view (FOV) 161 with light beam 120 and a second image in a second field of view (FOV) 162 with light beam 121. Thus, image display system 100 can provide a composite field of view that includes images associated with multiple input light beams.

Figure 2A:
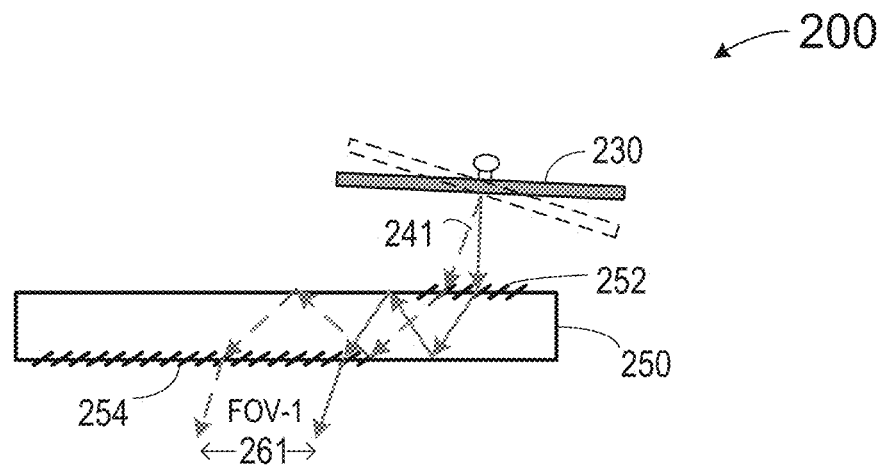
FIGS. 2A-2C are simplified schematic diagrams illustrating an image display system according to some embodiments of the present invention.
Figure 2B:
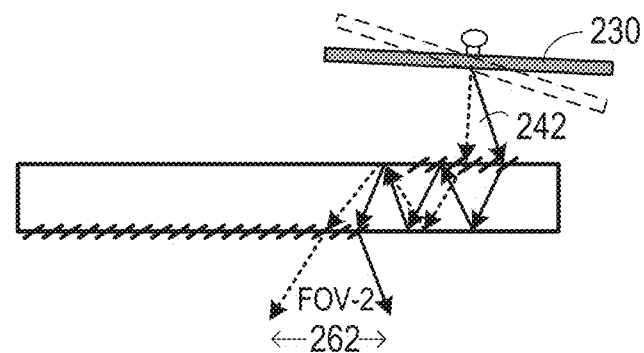
Figure 2C:
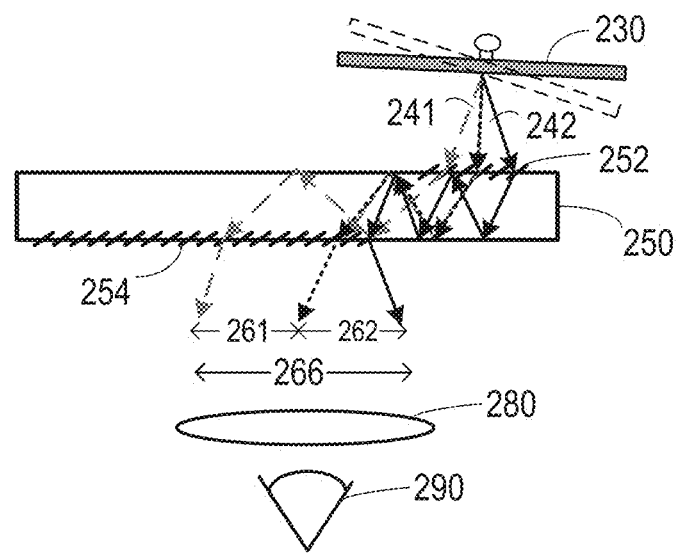

FIGS. 2A-2C are simplified schematic diagrams illustrating an image display system according to some embodiments of the present invention. FIGS. 2A-2B illustrate an image display system 200 that includes a scanning mirror 230 and a waveguide 250. Scanning mirror 230 is configured for receiving two or more incoming light beams and providing a plurality of reflected light beams, each of the plurality of reflected light beams configured to provide an image in a respective field of view (FOV).

In FIG. 2A, a first reflected light beam 241 is shown being scanned across an input coupling optical element 252 for coupling reflected light beam 241 into waveguide 250. After undergoing total internal reflection (TIR), light beam 241 reaches an output coupling optical element 254 for projecting the light beam from the waveguide to form a first image in a first field of view FOV-1 (261).

Input coupling optical element 252 and output coupling optical element 254 can be diffraction gratings. In some embodiments, the injected light enters the waveguide through an input coupling diffractive optical element (DOE) or input coupling grating (ICG), such as a nanograting structure with dimensions and relief patterns configured to diffract light of a particular wavelength or polarization while permitting light of other wavelengths or polarizations to transmit through the input coupling DOE. Similarly, the output coupling optical element can include an output coupling grating (OCG).

In FIG. 2B, a second reflected light beam 242 is shown being scanned across an input coupling optical element 252 for coupling reflected light beam 242 into waveguide 250. After undergoing total internal reflection (TIR), light beam 242 reaches output coupling optical element 254 for projecting the light beam from the waveguide to form a second image in a second field of view FOV-2 (262).

In FIG. 2C, both first reflected light 241 and second reflected light beam 242 are shown being scanned across an input coupling optical element 252 for coupling reflected light beams 241 and 242 into waveguide 250. After undergoing total internal reflection (TIR), light beams 241 and 242 reach output coupling optical element 254 for projecting the light beam from the waveguide to form a projected image in a composite field of view 266. In some embodiments, the image display system can also include optical elements 280, such as an eye lens, that directs the image to a user's eye 290. In some embodiments, the projected image in the composite field of view may be a tiled image including images projected by the multiple light beams, resulting in an enlarged field of view. In some embodiments, overlap between each sub-FOV from individual beams can result in a smoother transition in the tiled image. In some embodiments, the projected image can include an interleaved image including odd and even alternating regions from different light beams that can provide a higher density of image pixels and improve resolution.

The image display system can also include a scanning controller for controlling the formation of the projected image in the composite field of view. The image display system can include 2-D X-Y scanners to form images from multiple light sources, such as RGB combiners (Red-Green-Blue combiners). Each RGB combiner provides overlapped red, blue, and green collimated laser beams for forming an image. The controller can include timing and matching mechanisms, such as feedback loops and synchronization modules, etc.

Figure 3:
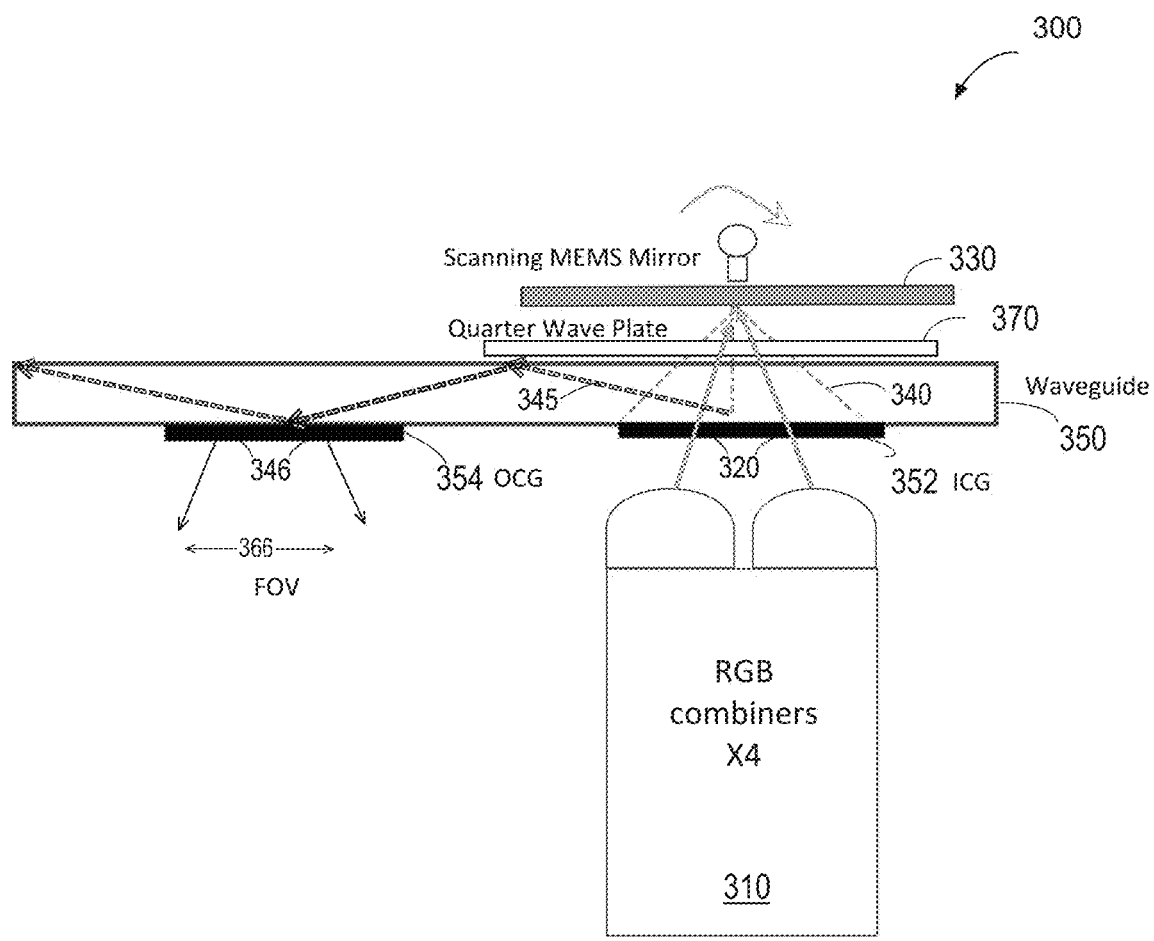
FIG. 3 is a simplified schematic diagram illustrating an image display system for providing a composite field of view (FOV) according to some embodiments of the present invention.

FIG. 3 is a simplified schematic diagram illustrating an image display system for providing a composite field of view (FOV) according to some embodiments of the present invention. The image display system can be part of a wearable imaging system for a user to view a virtual image. As shown in FIG. 3, an image display system 300 includes a source of imagewise modulated light 310, which in this example includes four RGB (red green blue) laser combiners 310. Imagewise modulated light beams 320 emitted by the laser combiners 310 are separated by a fixed angle from each other. Image display system 300 also includes a scanning mirror 330 and a waveguide 350. Note that only two of the four light beams are visible in the perspective of FIG. 3 as a remaining two beams would be directly behind those visible in FIG. 3. Scanning mirror 330 can be a MEMS (Micro-Electro-Mechanical-System) reflector/scanner for projecting an image into waveguide 350 which couples light to the user's eye. Display system 300 also includes a wave plate 370, such as a quarter wave plate (QWP) which converts linearly polarized light output by the laser combiners 310 into circularly polarized light.

As shown in FIG. 3, light source 310, e. g., RGB combiners 310, are configured to provide the multiple incoming light beams 320 having different incident angles. In this embodiment, the scanning mirror 330 and the polarization element 370 are disposed on an opposite side of waveguide 350 from light source 310. This configuration has many advantages over alternative arrangements. For example, disposing the mirror and light source on opposite sides of the waveguide enables a compact configuration and achieves a smaller form factor of the image display device. This configuration allows the scanning mirror to be close to the input coupling element, which in turn allows small light cones and a compact form factor of the system. The small form factor makes it suitable for a wearable eyepiece imaging device.

An incoupling grating (ICG) 352 (a form of input coupling element) is disposed on a lower surface 353 of the waveguide 350. The ICG 352 can be selective to polarization state in that it allows light having a linear polarization that is emitted by the RGB combiners 310 to pass through and reflectively diffracts light having linear polarization perpendicular to that emitted by the RGB combiners 310. Accordingly incoming light beams 320 from the RGB combiners 310 pass through the ICG 352, the waveguide 350 and the waveplate 370 before reaching the scanning mirror 330. In transmitting light, the waveplate 370 converts the polarization state of the light from the linearly polarized state emitted by the RGB combiners 310 to a circularly polarized light of a first handedness (e.g., RH or LH). On reflection by the scanning mirror 330 the handedness of the circularly polarized is changed to a second handedness (e.g., LH or RH). When the light now having the second handedness passes through the waveplate 370 for a second time the polarization state is changed to a linear polarization state that is perpendicular to the linear polarization state emitted by the RGB combiners 310. The interaction of the ICG 352 is dependent on the orientation of the linear polarization of light incident upon it and is configured to reflectively diffract light which is reflected back from the scanning mirror 330 through the wave plate 370 and has its polarization rotated as described above. The light that is reflectively diffracted by the ICG 352 will be diffracted at angles exceeding the critical angle for Total Internal Reflection (TIR) of the waveguide 350 and thus be coupled to guided modes of the waveguide 350. Waveguide 350 also has an output coupling optical element 354 for projecting a plurality of output light beams 346 from the waveguide to form a projected image in a composite field of view (FOV) 366.

Figure 4:
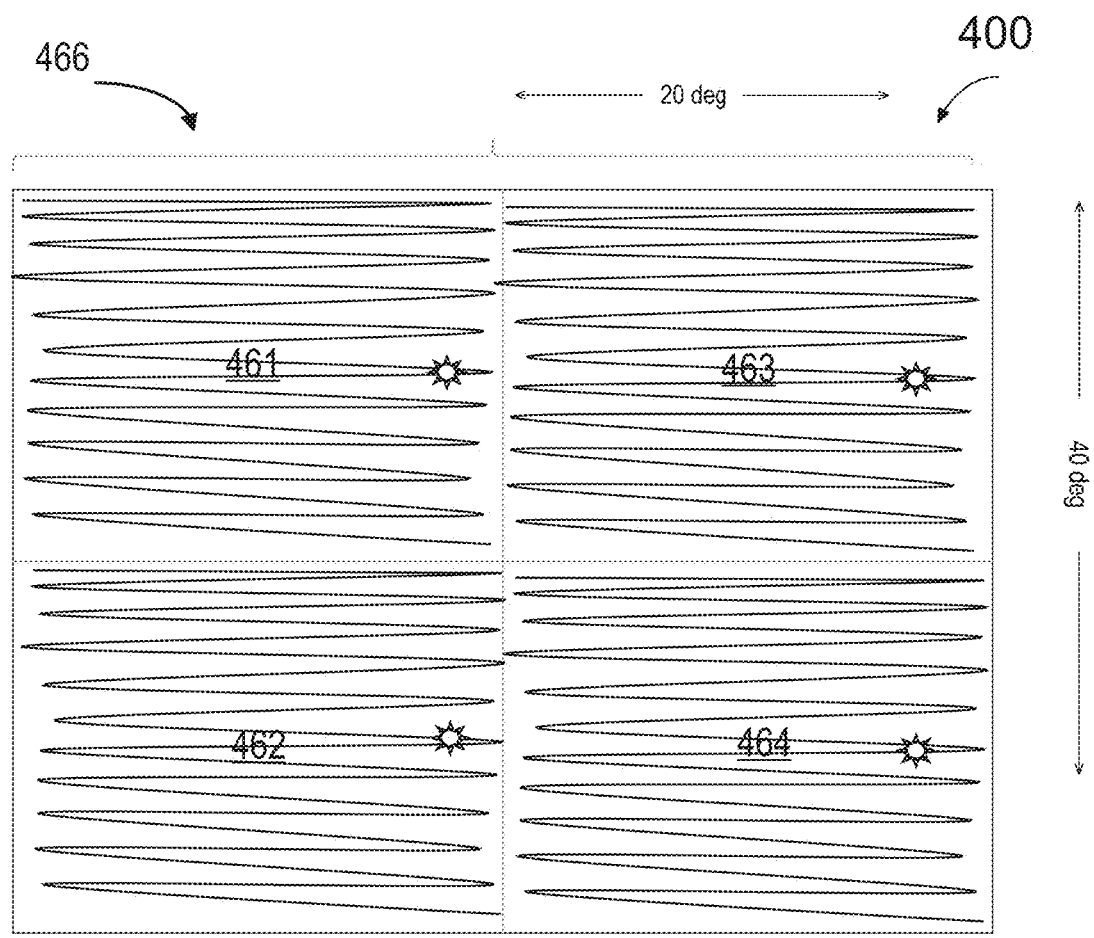
FIG. 4 is a simplified schematic diagram illustrating a composite field of view (FOV) according to some embodiments of the present invention.

FIG. 4 is a simplified schematic diagram 400 illustrating a composite field of view (FOV) according to some embodiments of the present invention. In this example, a full image is scanned simultaneously by four RGB beams in four quadrants. In some embodiments, each quadrant is a VGA (Video Graphics Array) image but the total stitched image is full HD (High Definition) with twice the field of view. With reference to FIG. 3, MEMS reflector/scanner 330 has a 20×20 degrees optical scan range. The multiple RGB (Red-Green-Blue) laser input beams, 320, are separated by 10 degrees angle theta θ. Light beams 320 pass through input coupling grating 352 and quarter wave plate 370 before reaching scanning mirror 330. The scanning mirror 330 reflects the light beams at different angles (due to different incident angles) to cover different fields of view. For example, in some embodiments, image display system 300, with two or four light beams, can provide a resulting scan image with 2× field of view (40×40 degrees) and resolution, which is compatible with a high definition 40×40 degrees specification. Moreover, the final image can have 50 degrees diagonal for a high definition display.

Figure 5:
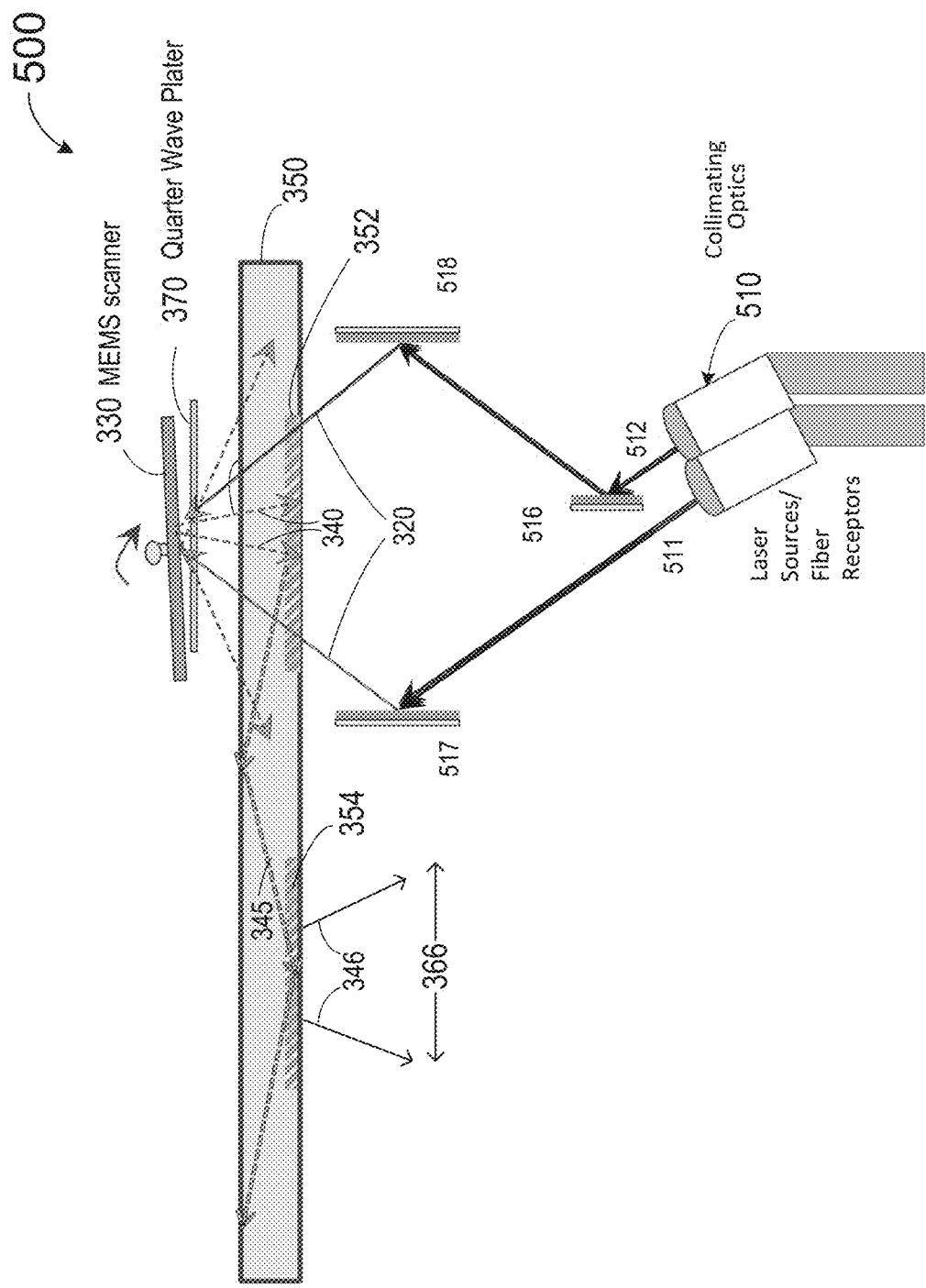
FIG. 5 is a simplified schematic diagram illustrating another image display system for providing a composite field of view (FOV) according to some embodiments of the present invention.

FIG. 5 is a simplified schematic diagram illustrating another image display system for providing a composite field of view (FOV) according to some embodiments of the present invention. Image display system 500 is similar to image display system 300 in FIG. 3 described above, and the same reference numerals are used to designate corresponding components in both FIGS. 3 and 5. As shown in FIG. 5, image display system 500 includes a light source 510 having multiple RGB (red green blue) laser combiners. Unlike laser combiners 310 in FIG. 3, which output beams 320 separated by a fixed angle from each other, two laser combiners 510 in FIG. 5 output parallel light beams 511 and 512. Mirrors 516, 517, 518 are used to redirect the light beams to provide incoming light beams 320 having different incident angles relative to scanning mirror 330.

Other than the light source, the components and functions of image display system 500 can be similar to those of image display system 300. Accordingly, description provided in relation to FIG. 3 are applicable to FIG. 5 as appropriate. Image display system 500 also includes a scanning mirror 330 and a waveguide 350. Scanning mirror 330 can be a MEMS (Micro-Electro-Mechanical-System) reflector/scanner for projecting an image in waveguide 350 for directing the image to a user's eye. Display system 500 also includes a polarization control element 370, such as a quarter wave plate (QWP).

As shown in FIG. 5, RGB combiners 510 are disposed on an opposite side of waveguide 350 from scanning mirror 330. Disposing the mirror and light source on opposite sides of the waveguide enables a compact configuration and allows for a smaller form factor of the image display device. Incoming light beams 320 having different incident angles are directed to a polarization sensitive input coupling optical element 352. The input coupling optical element 352 is also configured to reflectively diffract the light beams reflected by the scanning mirror 330 into the waveguide.

Light is emitted from the RGB combiners 510 in a first linear polarization state. The input coupling optical element 352 is configured to transmit light in the first linear polarization state substantially without deflecting (i.e., by diffraction) the light. After passing through the input coupling optical element 352 the light traverses the waveguide 350 and subsequently traverses the polarization control element 370. In passing through the polarization control element 370 the polarization of the light is converted from the first linear polarization state to a first circular polarization state (e.g., LH or RH). Subsequently the light is reflected by the scanning mirror 330. Reflection changes the light to a second circular polarization state (e.g., RH or LH). Subsequently the light passes through the polarization control element 370 and is converted to linearly polarized light that is polarized in a direction perpendicular to the polarization of light emitted by the RGB combiners 510. The input coupling optical element 352 is configured to selectively reflectively diffract only the polarization of light achieved after the second pass through the polarization control element. Light is diffracted by the input coupling optical element 352 to an angle that is above the critical angle for Total Internal Reflection (TIR) within the waveguide 350. Inside waveguide 350, light beams 340 light path 345 is obtained due to TIR. Waveguide 350 also has an output coupling optical element 354 for projecting a plurality of output light beams 346 from the waveguide to form a projected image in a composite field of view (FOV) 366. The composite field of view includes portions generated by each of the multiple RGB combiners.

Figure 6A:
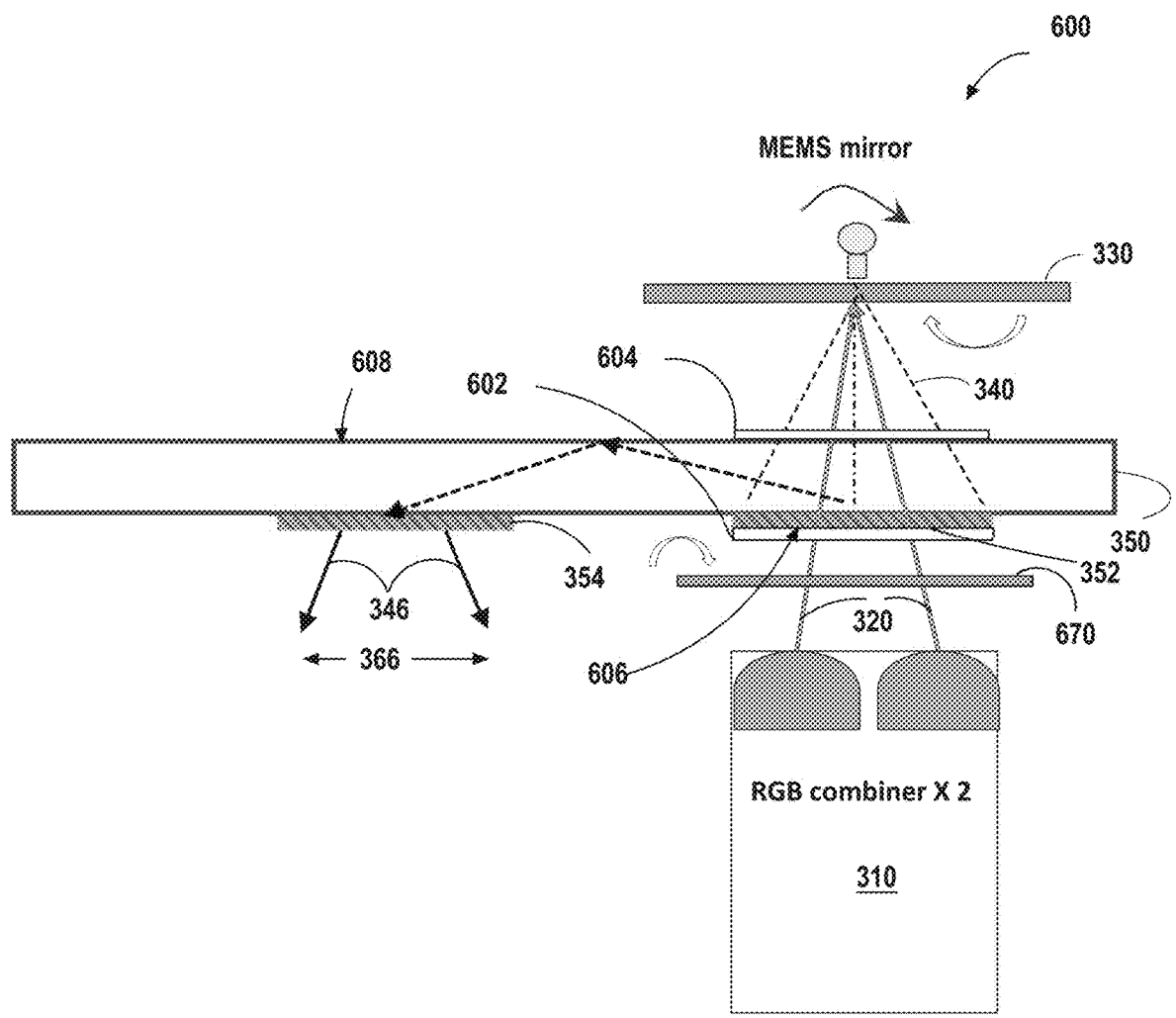
FIG. 6A is a simplified schematic diagram illustrating another image display system for providing a composite field of view (FOV) according to some embodiments of the present invention.

FIG. 6A is a simplified schematic diagram illustrating another image display system for providing a composite field of view (FOV) according to some embodiments of the present invention. Image display system 600 is similar to image display system 300 in FIG. 3 described above, and the same reference numerals are used to designate corresponding components in both FIGS. 3 and 6. As shown in FIG. 6A, image display system 600 includes a light source 310 having multiple RGB (red green blue) laser combiners providing incoming light beams 320 with different incident angles. Unlike the system 300 in FIG. 3 in which quarter wave plate 370 is disposed between scanning mirror 330 and waveguide 350, the mage display system 600 shown in FIG. 6A has a quarter wave plate 670 that is disposed between RGB combiners 310 and the waveguide 350. In some embodiments, incoming light beams 320 emerging from quarter wave plate 670 may have a first handedness circular polarization (e.g., RH or LH), and the reflected light beams 340 reflected off scanning mirror 330 may have a second handedness circular polarization (e.g., LH or RH). In this embodiment, the input coupling optical element 352 is polarization sensitive. For example, the input coupling optical element 352 (e. g., an ICG) can be configured to allow incoming light beams 320 with the first handedness circular polarization to pass through, and to couple reflected light beams 340 with second handedness circular polarization into waveguide 350. The input optical element 352 can reflectively diffract light with the second handedness circular polarization at an angle that is above the critical angle for total internal reflection for the waveguide 350. Reflected light beams 340 are configured to project tiled images. Inside waveguide 350, light beams 340 undergo total internal reflection (TIR). Waveguide 350 also has an output coupling optical element 354 for projecting a plurality of output light beams 346 from the waveguide to form a projected image in a composite field of view (FOV) 366.

A first antireflection layer 602 is formed at an outside surface 606 of the input optical coupling element. A second antireflection layer 604 is formed on a surface 608 of the waveguide 350 opposite the input coupling element facing the scanning mirror 330. The antireflection layers 602, 604 can be single or multiple layer optical interference coatings or surface relief structured layers including sub-wavelength size tapered structures which effectively gradually transition the index of refraction and thereby reduce or substantially eliminate reflections. The antireflection layers 602, 604 serve to avoid unintended bright spots in the field of view of the system 300 that are associated with Fresnel reflections at the surface 608 of the waveguide 350.

Figure 6B:
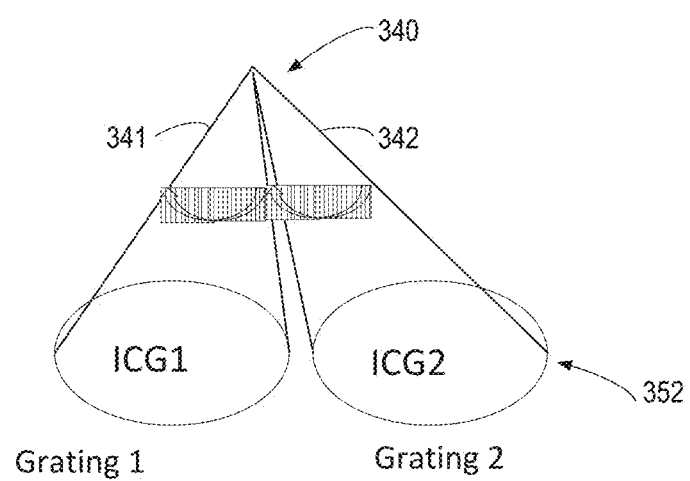
FIG. 6B is a simplified schematic diagram illustrating a portion of image display system 600 in FIG. 6A.

FIG. 6B is a simplified schematic diagram illustrating a portion of image display system 600 in FIG. 6A. In some embodiments, incoming light beams 320 can include a first incoming light beam and a second incoming light beam having different incident angles. As a result, reflected light beams 340 can include a first reflected light beam 341 from the first incoming light beam and a second reflected light beam 342 from the second incoming light beam. In some embodiments, input coupling element 352 can include two separate ICGs, e. g., ICG1 and ICG2, for the two reflected light beams. In alternative embodiments, the two reflected light beams may be coupled by different portions of a single input coupling optical element. In some embodiments, the first reflected light beam 341 and the second reflected light beam 342 can also have different polarizations. In this case ICG1 and ICG2 can have different polarization responses.

Figure 7:
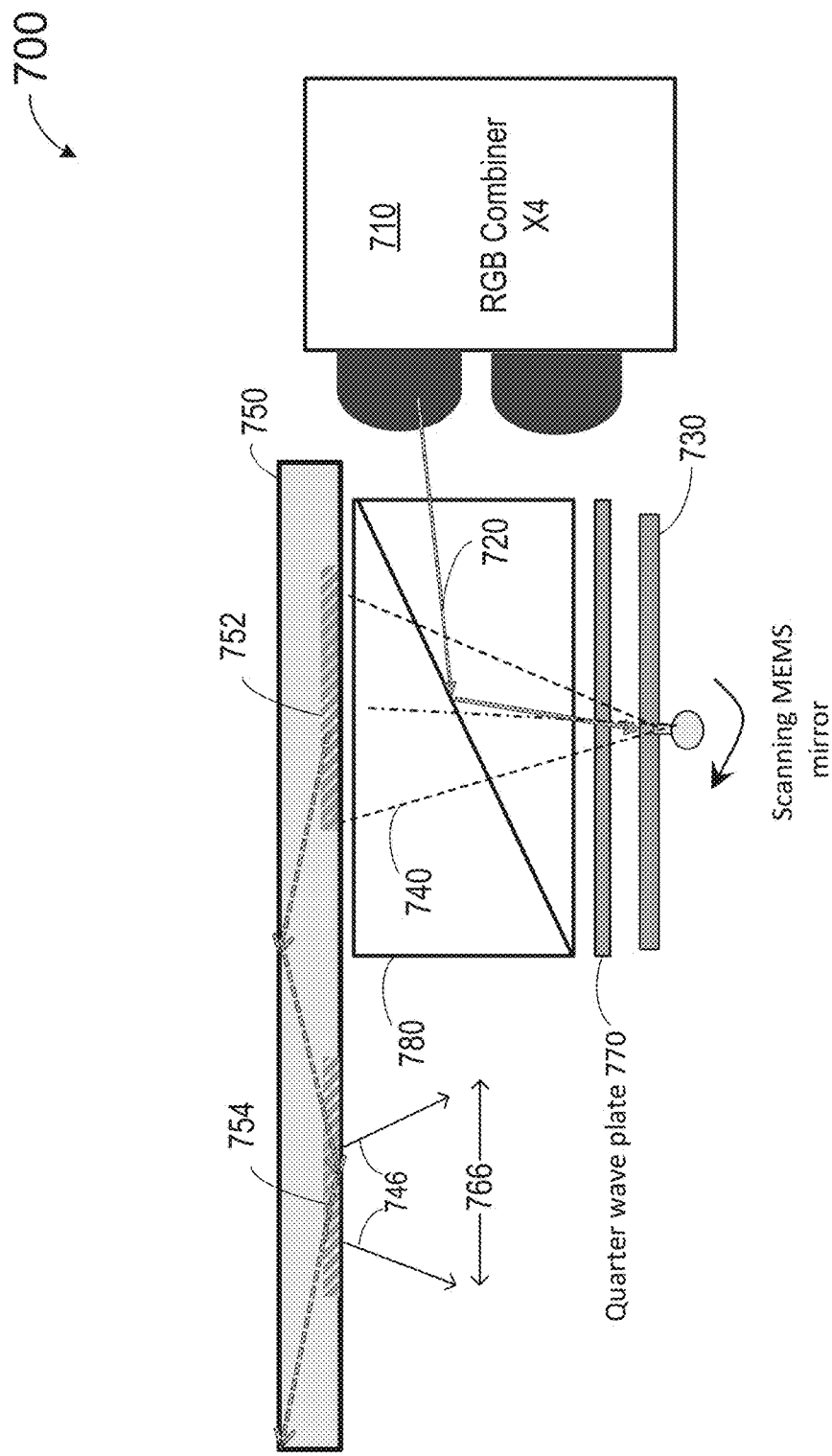
FIG. 7 is a simplified schematic diagram illustrating another image display system for providing a composite field of view (FOV) according to some embodiments of the present invention.

FIG. 7 is a simplified schematic diagram illustrating another image display system for providing a composite field of view (FOV) according to some embodiments of the present invention. As shown in FIG. 7, image display system 700 includes a light source 710, which in this example can have multiple RGB (red green blue) laser combiners, e. g., four combiners. Light source 710 provides incoming light beams 720 with different incident angles. Each of the light beams 720 is imagewise modulated based on image data from a portion of a complete field of view. The multiple light beams 720 together are used to display the complete field of view. Similar to the image display systems described above, image display system 700 also includes a scanning mirror 730 and a waveguide 750. Unlike the display systems in FIGS. 3, 5, and 6A, in which the light source and the scanning mirror are disposed on opposite sides of the waveguide, in image display system 700, light source 710 and scanning mirror 730 are disposed on the same side of waveguide 750. In order to allow scanning mirror 730 to scan incoming light beams 720 toward waveguide 750, image display system 700 includes a polarization sensitive beam splitter (PBS) 780, which directs incoming light beams 720 toward scanning mirror 730 through a quarter wave plate 770. Polarization sensitive beam splitter (PBS) 780 also allows reflected light beams 740 to pass through to reach input coupling grating 752. The PBS 780 includes a reflective polarizer 781 (e.g., wire grid) along a diagonal thereof. A first optical path segment extends from the RGB combiners 710 to the polarizer 781 and then through the quarter waveplate 770 to the scanning MEMS mirror 730.

A second optical path segment extends from the scanning MEMS mirror 730 through the polarizer 781 to the input coupling grating 752. The RGB combiner 710 can output linearly polarized light with a polarization orientation that is reflected by the polarizer 781. The quarter wave plate 770 converts the linearly polarized light reflected by the polarizer 781 to circularly polarized light having a certain handedness (e.g., RH or LH). Upon reflection by the scanning MEMS mirror 730 the handedness of the circularly polarized light is reversed (so that it will be RH if originally LH and will be LH if originally RH). Subsequently the circularly polarized light with handedness reversed is passes through the quarter wave plate 770 and in doing so is converted to a linearly polarization state perpendicular to that emitted by the RGB combiner 710 and therefore passes through the polarizer 781. In this case, input coupling grating 752 is polarization insensitive and couples reflected light beams 740 into waveguide 750. Inside waveguide 750, light beams 740 undergo total internal reflection (TIR). Waveguide 750 also has an output coupling grating 754 for projecting a plurality of output light beams 746 from the waveguide to form a projected image in a composite field of view (FOV) 766.

In image display system 700, the input coupling optical element, or ICG, 752 is not polarization sensitive. It is configured to couple incoming light beams into the waveguide, but not allow the incoming light beams to pass through the waveguide. Therefore, in these embodiments, light source 710 is disposed on the same side of the waveguide as the scanning mirror, and beam splitter 780 is used to direct the incoming light beams to the scanning mirror. In some embodiments, the incoming light beams are configured to be perpendicular to the scanning mirror. To simplify the diagrams, only one incoming light beam 720 is shown in FIG. 7. Using multiple incoming light beams, an enlarged field of view can be obtained, as described above in connection with FIG. 4. Depending on the embodiment, either multiple ICGs or a single ICG can be used.

Figure 8:
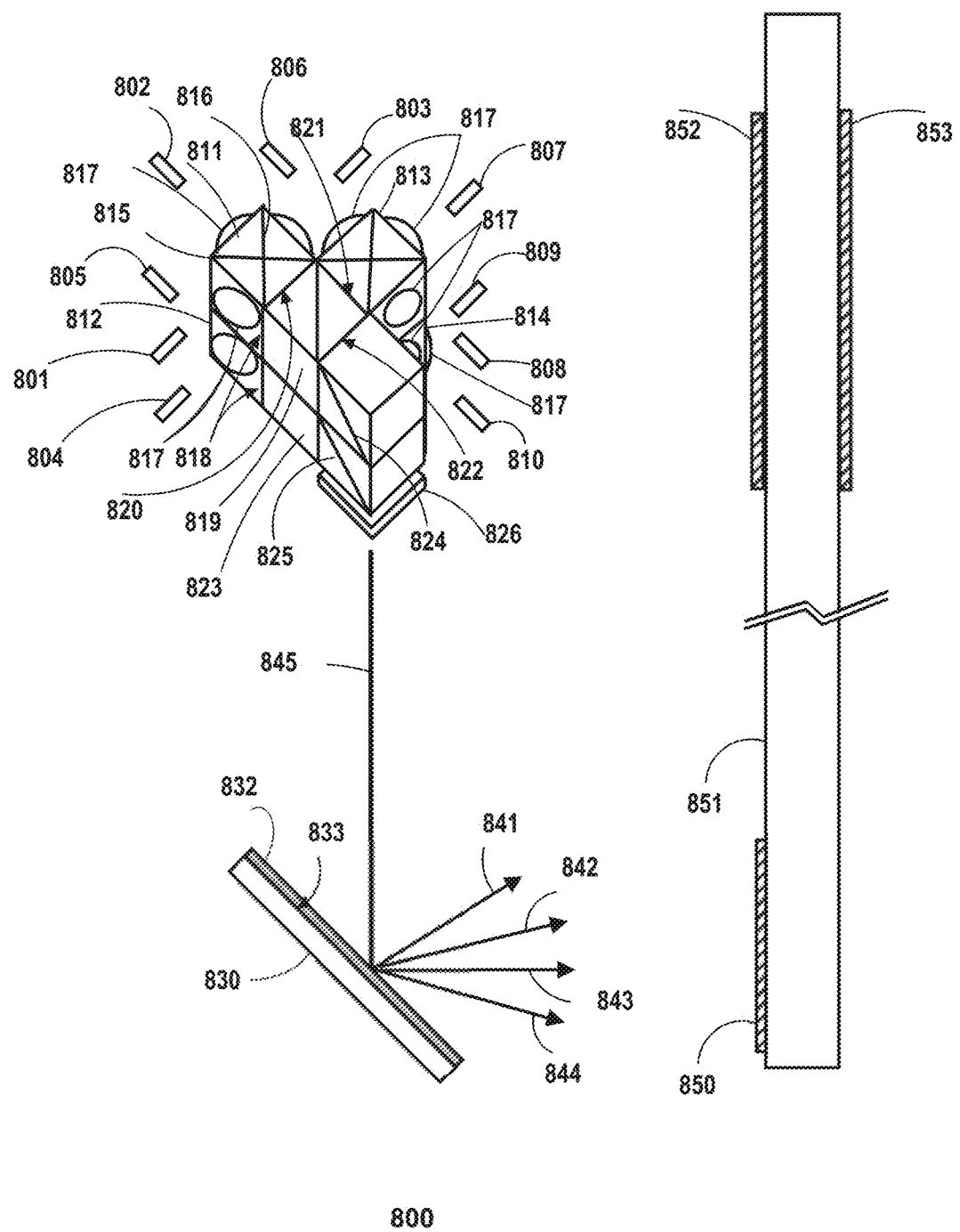
FIG. 8 is a schematic of a display system which uses a scanning mirror bearing multiple layers of polarization and spectrally selective liquid crystal materials which angularly separate independently modulated beam components to in order to separately illuminate quadrants of a total field of view.

FIG. 8 is a schematic of a display system 800 which uses a scanning mirror bearing multiple layers of polarization and spectrally selective liquid crystal materials which angularly separate independently modulated beam components to in order to separately illuminate quadrants of a total field of view. The system includes twelve laser diodes 801-810 (only ten of which are visible in FIG. 8) which are logically organized into four sets of three laser diodes. A first set includes a first red laser diode 801, a first green laser diode 802, and a first blue laser diode 803. A second set includes a second red laser diode 804, a second green laser diode 805, and a second blue laser diode (not visible in FIG. 8). A third set includes a third red laser diode 806, a third green laser diode 807, and a third blue laser diode 808. A fourth set includes a fourth red laser diode (not visible in FIG. 8) a fourth green laser diode 809 and a fourth blue laser diode 810. The second blue laser diode (not visible in FIG. 8) is located below the first blue laser diode 803, and the fourth red laser diode (not visible in FIG. 8) is located below the third red laser diode 806. Each of the four sets of three laser diodes includes a red laser diode, a green laser diode and a blue laser diode, so that by controlling the relative driving current and thereby the relative output of the three laser diodes within each set the chromaticity coordinates of the combined output of the three lasers in each set can be controlled within a certain color gamut.

The first set of laser diodes 801, 802, and 803 are optically coupled to a first dichroic combiner cube 811 which combines the output of the three laser diodes 801, 802, and 803 into a single beam. Similarly the second red laser diode 804, the second green laser diode 805 and the second blue laser diode (not visible in FIG. 8) are optically coupled to second dichroic combiner cube 812 which combines the output of the three laser diodes 804, 804 and the second blue laser diode into a single beam. Additionally the third red laser diode 806, the third green laser diode 807 and the third blue laser diode 808 are optically coupled to a third dichroic combiner cube 813 which combines the output of the third set of laser diodes 806, 807, 808 into a single beam. Furthermore the fourth red laser diode (not visible in FIG. 8) the fourth green laser diode 809 and the fourth blue laser diode 810 are optically coupled to fourth dichroic combiner cube 814. Each of the above mentioned dichroic combiner cubes 811, 812, 813, and 814 includes an embedded red reflective (short wavelength pass) filter 815 along one diagonal and an embedded blue reflective (long wavelength pass)

filter 816 along a second diagonal, so that the red reflective filter 815 and the blue reflective filter cross at 90°.

Laser collimating lenses 817 (only a subset of which are visible in FIG. 8) are positioned between input faces 818 (only a limited number of which are labeled to avoid crowding the figure) of the dichroic combiner cubes and the laser diodes 801-810. The first set of laser diodes 801, 802, and 803 the output of which is combined by the first dichroic combiner 811 can have a polarization (S or P) that is perpendicular to a polarization (P or S) of the third set of laser diodes 806, 807, and 808 the output of which is combined with the third dichroic combiner 813. The first dichroic combiner 811 and the third dichroic combiner 813 are optically couple to a first polarization beam splitter (PBS) (serving as a combiner) 819 such that the PBS 819 receives the combined output of the first set of laser diodes 801, 802, and 803 at a first input face 820 and receives the combined output of the third set of laser diodes 806, 807, and 808 at a second input face 821 and outputs a combined collinear, collimated beam that includes the combined output of the first and third sets of laser diodes 801, 802, 803, 806, 807, and 808 at an output face 822.

Analogously, the second dichroic beam combiner 812 and the fourth dichroic beam combiner 814 are optically coupled to a second PBS combiner 823. Analogous to the case described above, the second set of laser diodes 804, 805 (and the second blue laser diode, not visible in FIG. 8) the output of which is combined by the second dichroic combiner 812 can have a polarization (S or P) that is perpendicular to a polarization (P or S) of the fourth set of laser diodes 809, 810 (and the fourth red laser diode, not visible in FIG. 8) the output of which is combined with the third dichroic combiner 813. The second PBS 823 receives the combined output of the second red laser diode 804, the second green laser diode 805 and the second blue laser diode (not visible in FIG. 8) from the second dichroic beam combiner 812 and receives the combined output of the fourth red laser diode (not visible in FIG. 8) the fourth green laser diode 809 and the fourth blue laser diode 810 from the fourth and produces therefrom a six component beam include the output of the second set of laser diodes 804, 805 and the second blue laser diode (not visible in FIG. 8) and the output of the fourth set of laser diodes 809, 810 including the fourth red laser diode (not visible in FIG. 8). The corresponding color laser diodes optically coupled to the first PBS 819 (for example the first red laser diode 801, and the third red laser diode 806) suitably have nominally (allowing for manufacturing variance) the same emission wavelength and the corresponding color laser diodes optically coupled to the second PBS 823 (for example the second green laser diode 805 and the fourth green laser diode 809) suitably have the nominally the same emission wavelength, however, in one embodiment there is a purposeful difference in the emission wavelength of corresponding color laser diodes coupled to the first PBS 819 and the second PBS 823. For example the first green laser diode 802 and the third green laser diode 807 can have an emission wavelength of 520 nanometers whereas the second green laser diode 804 and the fourth green laser diode can have an emission wavelength of 535 nanometers.

The six component output of the first PBS 819 is optically coupled through a beam folding mirror 824 to a three spectral component reflector 825. Note that the beam folding mirror 824 and the three spectral component reflector 825 are embedded in transparent cubes in a similar fashion to the dichroic beam combiners 811, 812, 813, and 814 and the PBSs 819, 823. The six component output of the second PBS 823 is also optically coupled to the three component reflector 825. The three spectral component reflector 825 reflects the output of the second PBS 823 and transmits the output of the first PBS 819 due to differences in wavelength of light coupled through the first PBS 819 and the second PBS 823 which originates in differences of the emission wavelengths of the laser diodes 801-810 discussed above. Note that each of the three spectral components reflected by the reflector 825 includes two different polarization components that originate from two different laser diodes. The three spectral component reflector 825 thus outputs a twelve component beam 845 that includes four components for each color channel (i.e., four red components, four green components and four blue components). For each color channel the four color components are differentiated by a linear polarization orientation and wavelength, there being two possible polarization orientations and two possible wavelengths for each color channel. The twelve component output of the three spectral reflector 825 is coupled through a quarter wave plate (QWP) 826 to a scanning mirror 830. The QWP 826 converts one linear polarization state to a right-hand circularly polarized (RHCP) state and convert the second linear polarization state that is perpendicular to the first linearly polarization state to a left-hand circularly polarized (LHCP) state.

The scanning mirror 830 has a multilayer diffraction grating 832 on a beam facing surface 833. The multilayer diffraction grating 832 can include twelve spectrally and polarization state selective layers, each having a predetermined grating period and orientation designed based on a predetermined operating wavelength to diffract one component of the twelve component beam 845 in a particular direction for each orientation of the scanning mirror 830. The scanning mirror 830 has two degrees of freedom so as to be able to generate 2D imagery. The multilayer diffraction grating 832 can, for example, include multiple Cholesteric Liquid Crystal Grating (CLCG) layers. CLCG diffraction gratings have a handedness that describes molecule layer to layer relative rotation. CLCG diffraction gratings reflectively diffract circularly polarized light which matches the handedness of the CLCG and transmit the opposite handedness circularly polarized without diffraction. In some embodiments, the twelve component beam can have a two red light components with a wavelength of 625 nm, a two red light components with a wavelength of 650 nm, two first green light components with a wavelength of 520 nm, two second green light G2 with a wavelength 535 nm, two blue B1 light components with a wavelength of 450 nm, and two blue light components with a wavelength of 465 nm. Components with a common wavelength are differentiated by handedness of circular polarization. The multilayer diffraction grating 832 reflectively diffracts the components of the twelve component beam 845.

Upon diffraction by the multilayer diffraction grating 832, the twelve components of the beam 845 can be segregated into four quadrant beams 841, 842, 843, 844 each having red, green, and blue color components which are modulated with image information for a quadrant of a full field of view. As the scanning mirror deflects, the four quadrant beams 841, 842, 843, 844 are scanned in angle, and due to multiplicity of beams and their angular separation, a larger FOV can be formed. In embodiments of the invention, portions of video data for a full field of view are used to separately modulate the multiple scanned beams. Furthermore intensity modulation applied to the quadrant beams 841, 842, 843, 844 can be adjusted to produce the same chromaticity coordinates over a chromaticity coordinate area corresponding to an overlap color gamuts associated with wavelengths in each of the four quadrant beams 841, 842, 843, 844.

The four quadrant beams 841, 842, 843, 844 are coupled through an incoupling grating (ICG) 850 of a waveguide/eyepiece 851. The waveguide/eyepiece 851 is a component of augmented reality glasses (not shown in FIG. 8). The waveguide/eyepiece 851 also includes an orthogonal pupil expander (OPE) 852 and an exit pupil expander (EPE) 853. The OPE 852 serves to distribute light vertically (in the orientation of FIG. 8) over the EPE 853, and the EPE 853 serves to out couple light to a user's eye (not shown) looking through the EPE 853. The EPE successively outputs portions of beams propagating past it, thereby forming a wider output beam which is the composite of the multiple out coupled portions. Beams that our output from the EPE 853 are derived from beams input through the incoupling grating 850. Note that the EPE 853 can be displaced perpendicularly to the plane of the drawing sheet relative to the OPE 852 and not in overlying relation.

Figure 9:
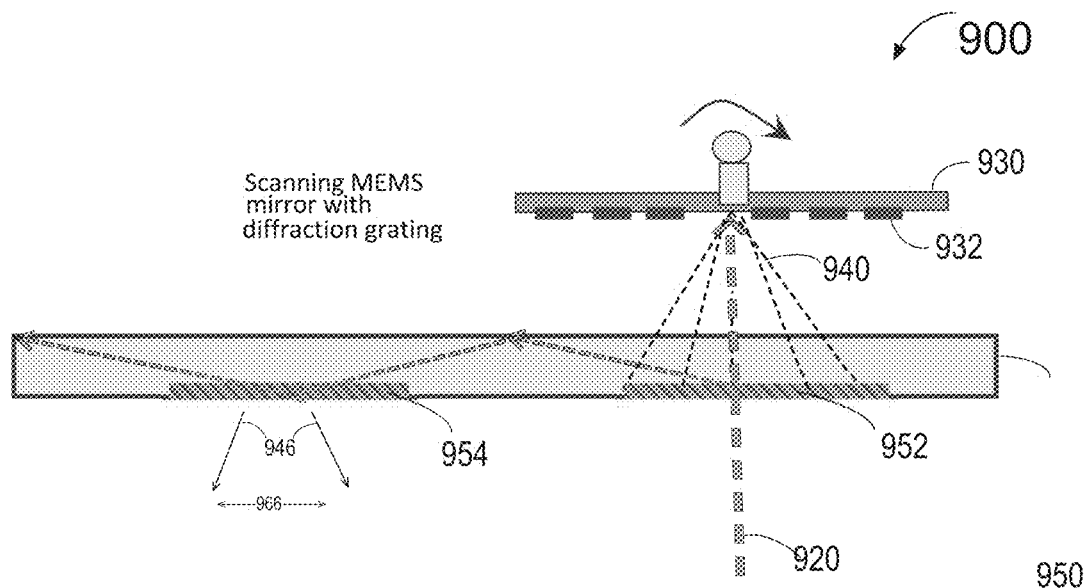
FIG. 9 is a simplified schematic diagram illustrating an image display system according to some embodiments of the present invention.

FIG. 9 is a simplified schematic diagram illustrating another image display system according to some embodiments of the present invention. As shown in FIG. 9, an image display system 900 includes a light source (not shown) for providing collimated incoming light beams 920, including multiple incoming light beams, which can have different wavelengths or different polarizations. Image display system 900 also has a scanning mirror 930 with a diffractive surface 932 for receiving the collimated incoming light beam and for providing a plurality of reflectively diffracted light beams having different angles of diffraction. The diffractive surface can have the structure of the multilayer diffraction grating 832 discussed above in reference to FIG. 8. Each of the plurality of reflectively diffracted light beams is configured to provide an image in a respective field of view (FOV). A waveguide 950 has an input coupling optical element 952 for coupling the plurality of reflected light beams into the waveguide and an output coupling optical element 954 for projecting a plurality of output light beams 946 from the waveguide to form a projected image with a composite field of view (FOV) 966.

Figure 10:
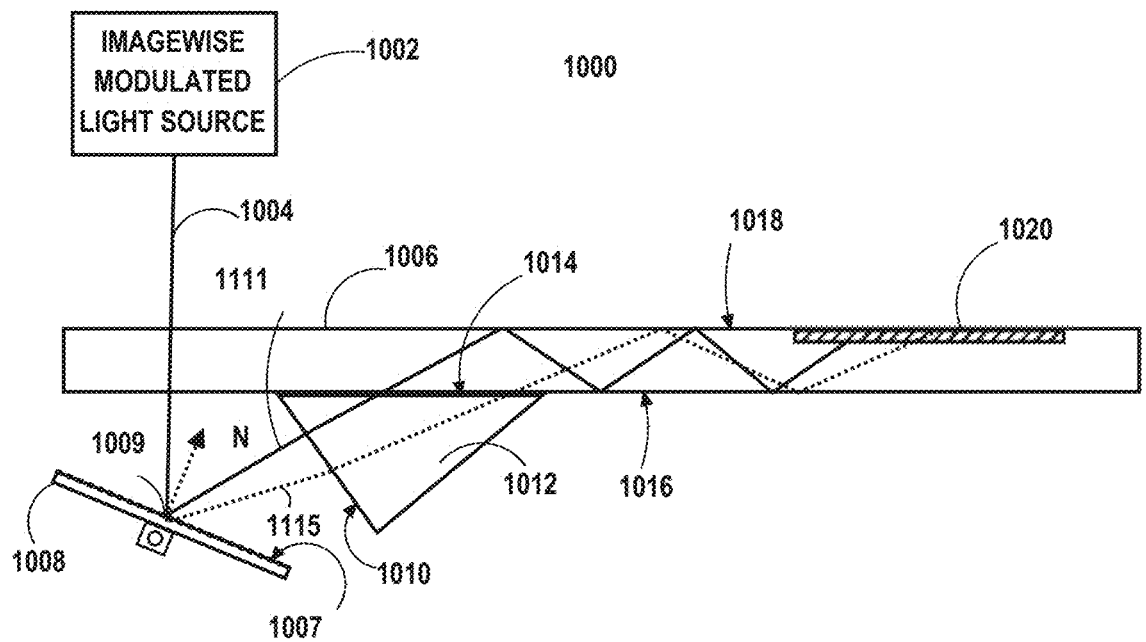
FIG. 10 is a simplified schematic diagram illustrating another image display system according to some embodiments of the present invention.

In the embodiment of FIG. 9, scanning mirror 930 is disposed on an opposite side of waveguide 950 as the light source that provides incoming light beams 920. Input coupling optical element 952 of the waveguide is configured to allow the collimated incoming light beam 920 to pass through the input coupling element 952 and through waveguide 950, and is also configured to couple the plurality of reflectively diffracted light beams 940 into waveguide 950 by diffracting the plurality of reflectively diffracted beams at an angle above the critical angle of the waveguide. In some embodiments, input coupling optical element 952 is a polarization sensitive input coupling grating (ICG). At type of polarization sensitive ICG that may be used is discussed below in reference to FIG. 19. Each of the multiple incoming light beams includes a combined RGB light beam for forming scanned images. In an embodiment, the multiple incoming light beams include a first combined RGB light beam with R1 G1 B1 having wavelengths 625 nm, 520 nm, and 450 nm, respectively, and a second combined RGB light beam with R2 G2 B2 having wavelengths 650 nm, 535 nm, and 465 nm, respectively FIG. 10 is an edge on view of a waveguide display system 1000 according to an alternative embodiment. A source of imagewise modulated light 1002 outputs a compound beam 1004 including at least two sets of red (R), green (G) and blue (B) spectral components (e.g., R1, G1, B1; R2, G2, B2), with each spectral component being modulated based on video data. The sets of RGB spectral components can be differentiated by linear polarization state, by circular polarization handedness (e.g., LH vs. RH) or by slight differences in wavelength. The compound beam 1004 passes through an eyepiece waveguide 1006 and impinges on a two degree of freedom scanning mirror 1008. A diffraction grating 1009 is formed or supported on a surface 1007 of the scanning mirror 1008 on which the compound beam 1004 is incident. The diffraction grating 1009 is designed to angularly separate the at least two sets of RGB components, so that one of the at least two sets of RGB components illuminates a first portion of a field of view of the waveguide display system 1000 and a second of the at least two sets of RGB components illuminates a second portion of the field of view of the waveguide display system 1000. As shown the diffraction grating 1009 separates the compound beam 1004 into a first RGB set beam 1111 and a second RGB set beam 1115. Although not shown the individual RGB components may also be angularly separated and in such case modulated with video information with R, G, B channel delays set in accordance with the angular separation of the RGB components. The diffraction grating 1009 may for example take the form of a stack of 6 Cholesteric Liquid Crystal Gratings (CLCGs) with each of the six have a helical pitch tuned to a particular spectral component (e.g., one of the R1, G1, B1; R2, G2, B2 components) and have a grating (lateral) pitch set according to a designed diffraction angle. Accordingly, a first set of RGB components can be diffracted at a first angle and a second set of RGB components can be diffracted at a second angle. It is noted that such an angular dispersion differs from the dispersion produced by an ordinary diffraction grating in which case the diffraction angle is a monotonic function of the wavelength. CLCGs are discussed further below with reference to FIG. 19 and FIG. 20. If CLCGs are used the source of imagewise modulated light 1002 can be configured to output circularly polarized light by, for example, including a broadband Quarter Wave Plate (QWP).

The scanning mirror 1008 deflects the first RGB set beam 1111 and the second RGB set beam 1115 into a first surface 1010 of an in-coupling prism 1012. The scanning mirror 1008 is driven in coordination with the modulation of RGB components of the beams 1111, 1115. The in-coupling prism 1012 has a second surface 1014 which is coupled with an index matching adhesive 1015 to a first surface 1016 of the eyepiece waveguide 1006. The beams 1111, 1115 are propagated through the in-coupling prism 1112 into the eyepiece waveguide 1006 at angles above the critical angle for total internal reflection and experience multiple reflections at the first surface 1116 and an opposite second surface 1018 of the eyepiece waveguide 1006 while propagating along the eyepiece waveguide 1006. Ultimately the beams 1011, 1115 reach an orthogonal pupil expander 1016 which takes the form of a diffraction grating with grooves extending in a plane perpendicular to the plane of the drawing sheet and within that plane at 45 degrees with respect to the perpendicular to plane of the drawing sheet. The orthogonal pupil expander 1016 incrementally reflects portions of the beam 1011, 1115 perpendicularly to the plane of the paper towards an exit pupil expander (not shown) which takes the form of a diffractive optical element (e.g., grating) which redirects light out of the eyepiece waveguide 1006 toward a user's eye.

Figure 11:
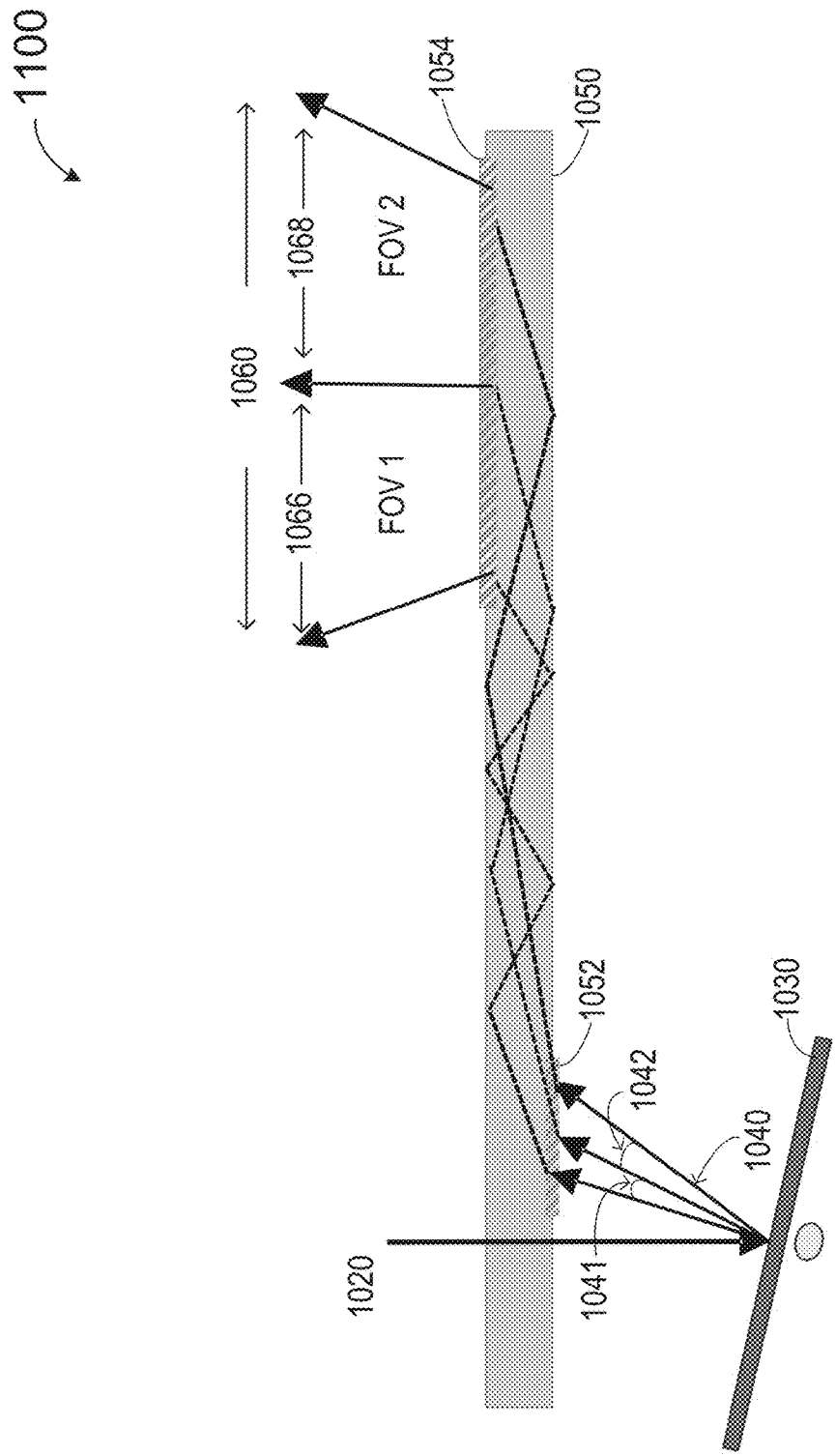
FIG. 11 is a simplified schematic diagram illustrating another image display system according to some embodiments of the present invention.

FIG. 11 is a simplified schematic diagram illustrating another image display system according to some embodiments of the present invention. An image display system 1100 in FIG. 11 is similar to image display system 1000 in FIG. 10. Unlike image display system 1000 in FIG. 10, which relies on in-coupling prism 1112 for in-coupling the light beams into the waveguide, in image display system 1100, an input coupling element 1052 is used to in-couple the light beams into waveguide 1050, and input coupling element 1052 does not need to be polarization sensitive. To simplify the illustration, the same reference numerals are used in both FIGS. 10 and 11 to designate the common components. As shown in FIG. 11, image display system 1100 includes a scanning mirror 1030, e. g. an MEMS scanning mirror, for receiving an incoming light beam 1020 and providing scanning reflected light beams 1040. Image display system 1000 also includes a waveguide 1050 for receiving the scanning reflected light beams. Incoming light beam 1020 is multiplexed to contain wavelengths in the vicinity of red, green, and blue, for example, R1 R2 . . . , G1 G2 . . . , B1 B2 . . . , as described above. Further, incoming light beam 1020 is directed to be incident on waveguide 1050 at an angle less than the total internal reflection (TIR) critical angle, and therefore, is not in-coupled into waveguide 1050. Scanning mirror 1030 can include diffractive elements that direct components of incoming light beam in different directions depending on the wavelengths resulting in separate light beams. The diffraction grating 832 discussed above in the context of FIG. 8 can be used for the diffractive elements included in the scanning mirror 1030. The angles of incidence of these light beams into the waveguide is varied using the MEMS scanning mirror rotation angle. In the simplified drawing of FIG. 11, two light cones 1041 and 1042 are shown as a result of scanning two light beams reflected off scanning mirror 1030. In some embodiments, light beams 1041 and 1042 are in-coupled into waveguide 1050 by an input coupling element 1052, such as an ICG. In this embodiment, input coupling elements 1052 does not need to be polarization sensitive.

As shown in FIG. 11, scanning light beam 1041 undergoes total internal reflection (TIR) in waveguide 1050 and is projected from the waveguide through an output coupling optical element 1054 to form a first image in a second field of view (FOV1) 1066. Similarly, scanning light beam 1042 undergoes total internal reflection (TIR) in waveguide 1050 and is projected from the waveguide through output coupling optical element 1054 to form a second image in a second field of view (FOV2) 1068. In embodiments of the invention, image data are encoded as necessary into the multiple scanned beams. Image display system 1100 is configured to form an image in a composite FOV 1060 that includes the first FOV 1066 and a second FOV 1068.

As shown in FIG. 11, in some embodiments, the light source that provides the incoming light beam 1020 is disposed on an opposite side of the waveguide 1050 as scanning mirror 1030. The light source is configured to provide the incoming light beam 1020 at an angle to waveguide 1050 that is less than the TIR critical angle. Therefore, incoming light beam 1020 passes through waveguide 1050 to reach scanning mirror 1030 without being in-coupled into the waveguide. Further, reflected light beams 1040 enter into waveguide 1050 through an input coupling optical element 1052, which is offset from incoming light beam 1020. In some embodiments, the reflective surface on the scanning mirror can be made substantially parallel to the substrate (to save volume) by using a diffractive off-axis mirror, in which the angle of incidence are not the same as the angle of reflection, which can lead to a more compact configuration of the imaging device.

Figure 12:
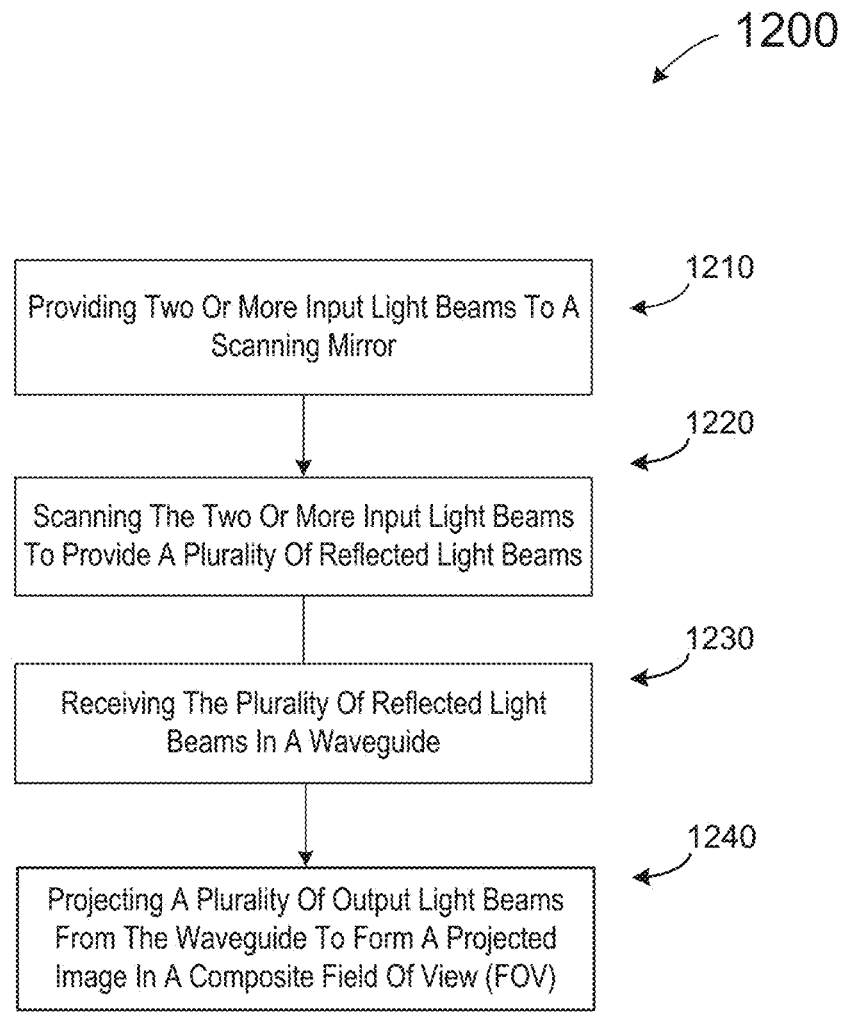
FIG. 12 is a simplified flowchart illustrating a method for displaying an image.

FIG. 12 is a simplified flowchart illustrating a method for displaying an image. As shown in FIG. 12, method 1200 includes providing two or more input light beams to a scanning mirror (1210). The method also includes scanning the two or more input light beams to provide a plurality of reflected light beams (1220). Each of the plurality of reflected light beams is configured to provide an image in a respective field of view (FOV). The method further includes receiving the plurality of reflected light beams in a waveguide (1230). Additionally, the method includes projecting a plurality of output light beams from the waveguide to form a projected image in a composite field of view (FOV) (1240). Examples of image display systems that implement method 1200 are described above in connection with FIGS. 1-10. In some embodiments of the method, the composite field of view is larger than the FOV provided by each of the two or more input light beams. The image in the composite FOV can be a tiled image including the images from each of the input light beams.

Figure 13:
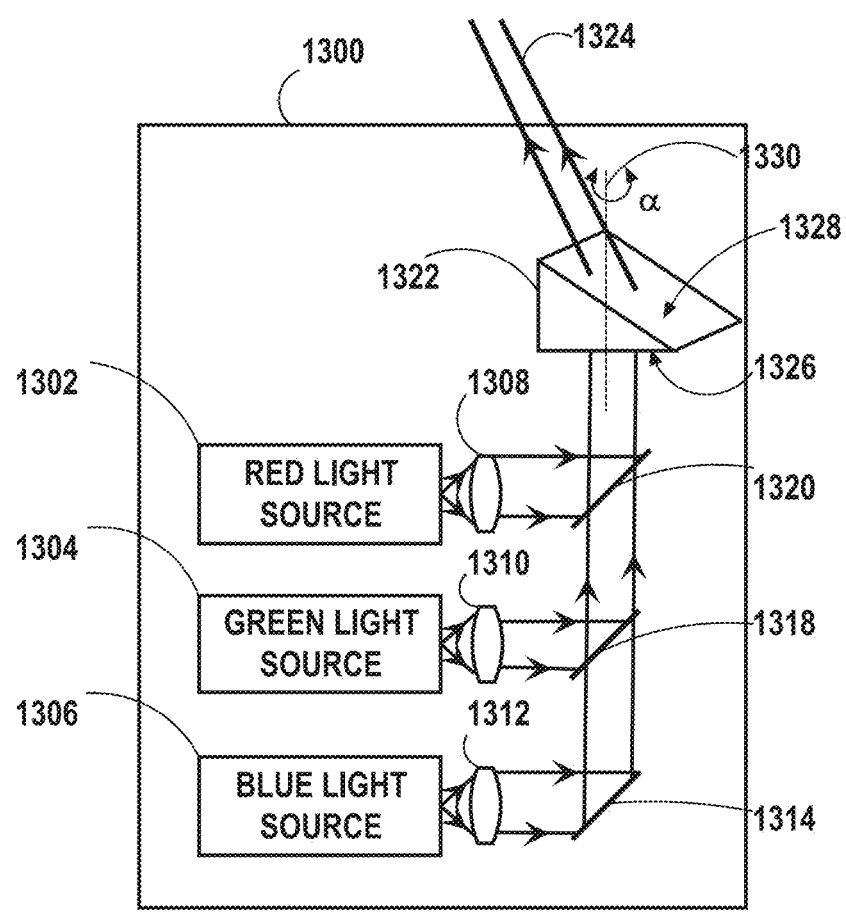
FIG. 13 is a schematic illustration of a light engine according to an embodiment of the present invention.

FIG. 13 is a schematic illustration of a light engine 1300 according to an embodiment. The light engine 1300 can be used as the any of the light sources 110, 310, 510 or 710 of the display systems described hereinabove. Referring to FIG. 13, the light engine 1300 includes a red light source 1302, a green light source 1304 and a blue light source 1306. The light sources 1302, 1304, 1306 may, for example, take the form of laser diodes (LDs) or light emitting diodes (LEDs). A red channel collimating lens 1308, a green channel collimating lens 1310, and a blue channel collimating lens 1312 are respectively arranged at the outputs of the red light source 1302, the green light source 1304 and the blue light source 1306. The blue light source 1306 is optically coupled through the blue channel collimating lens 1312, via a blue channel optical path folding mirror 1314, through a green band reflecting dichroic mirror 1318 and through a red band reflecting dichroic mirror 1320 to a beam deflecting prism 1322. The green light source 1304 is optically coupled through the green channel collimating lens 1310 via the green band reflecting dichroic mirror 1318 to the beam deflecting prism 1322. The red light source 1302 is optically coupled through the red channel collimating lens 1308, via the red band reflecting dichroic mirror 1320 to the beam deflecting prism 1322. Light from the light sources 1302, 1304, 1306 reaches the beam deflecting prism 1322 as a multiple spectral component collimated beam 1324. The multiple spectral component collimated beam 1324 is incident on an input surface 1326 of the beam deflecting prism 1322 and exits through a canted surface 1328 of the beam deflecting prism 1322 which serves to refract and thereby deflect the multiple spectral component collimated beam 1324. Optionally a diffraction grating (not shown) can be placed on the input surface to contribute to the deflection of the beam 324 and compensate for chromatic dispersion associated with refraction at the canted surface 1328. The beam deflecting prism 1322 is rotated by an angle alpha about an axis 1330 that is parallel to the incident multiple spectral component collimated beam 1324. Rotating the beam deflecting prism 1322 by the angle alpha serves to impart a beam direction cosine perpendicular to the plane of the drawing sheet. Multiple, e.g., two, four or more light engines of the form shown in FIG. 13 can be arranged in an assembly (not shown) and have their respective beam deflecting prisms 1322 oriented such that the multispectral component beams 1324 from the four multiple light engines 1300 converge at the surface of one of the beam scanning mirrors used in the embodiments described hereinabove. Although not shown in FIG. 13, more light sources each having a different spectral output can be added in like manner to the arrangement shown in FIG. 13. For example, a pair of narrow band light sources with different peak wavelengths and substantially nonoverlapping spectral outputs can be provided for each of red, blue and green colors. Providing such additional light sources will yield an increased color gamut for the display systems described herein above.

Figure 14:
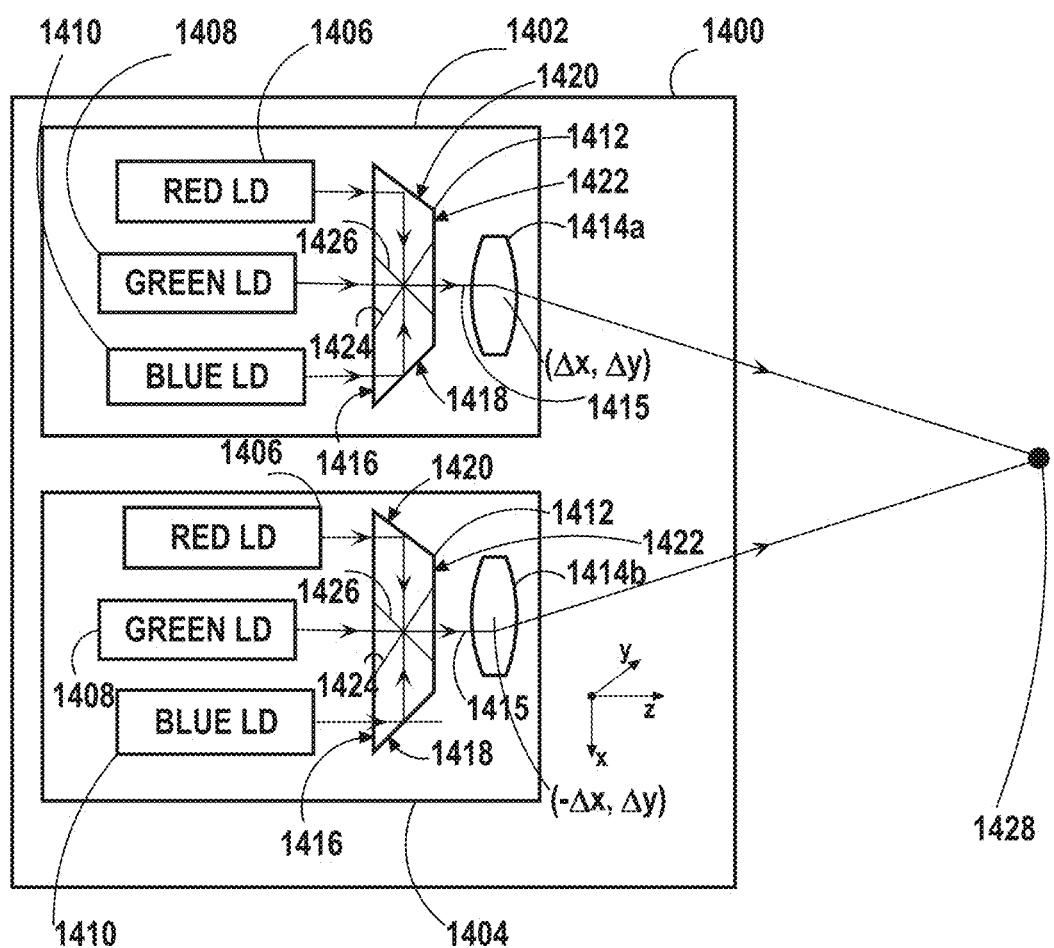
FIG. 14 is a schematic illustration of a light engine according to another embodiment of the present invention.
Figure 15:
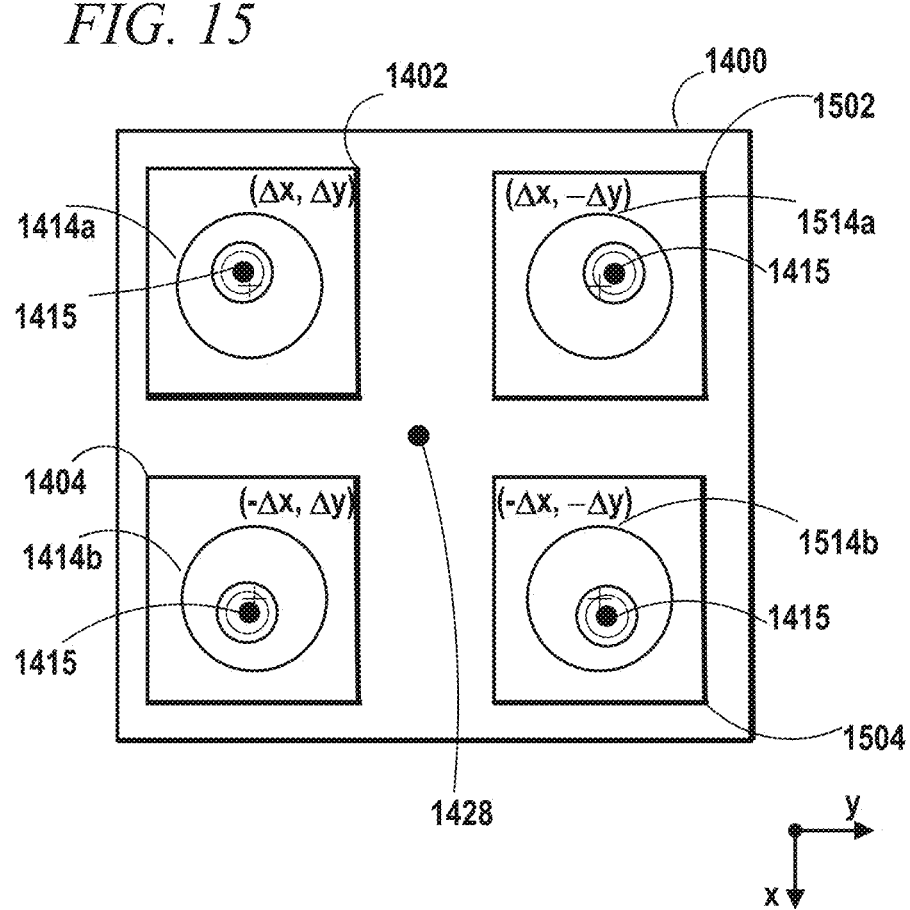
FIG. 15 is a front view of the light engine shown in FIG. 14.

FIG. 14 is a schematic illustration of a light engine 1400 according to another embodiment and FIG. 15 is a front (output end) view of the light engine 1400 shown in FIG. 14. The light engine 1400 can be used as any of the light sources 110, 310, 510 or 710 of the display systems described hereinabove. Referring to FIGS. 14-15 the light engine 1400 includes a first beam source 1402, a second beam source 1404, a third beam source 1502 and a fourth beam source 1504. The third beam source 1502 and the fourth beam source 1504 will have the same construction with the notable exception of the positioning of beam forming lenses as discussed further below. Referring particularly to FIG. 14, the internal details of the first beam source 1402 and the second beam source 1404 are shown. The first beam source 1402 includes a first output lens 1414a and the second beam source 1404 includes a second output lens 1414b. Each beam source 1402, 1404 includes a red laser diode 1406, a green laser diode 1408 and a blue laser diode 1410 which are coupled through a dichroic beam combiner 1412 to the associated collimating and beam deflecting lens 1414a, 1414b. (Alternatively, in lieu of the laser diodes 1406, 1408, 1410 another type of light source such as for example a light emitting diode may be used.). Each dichroic beam combiner 1412 includes an input surface 1416, a lower beam folding mirror surface 1418 canted at +45 degrees from the indicated Z-axis, an upper beam folding mirror surface 1420 tilted at −45 degrees from the indicated Z axis (assuming in each case that the left edge of each respective surface is taken as the axis of rotation) and an output surface 1422. The beam folding mirror surfaces 1418, 1420 may be Total Internal Reflection (TIR) surfaces or metallized surfaces, for example. A blue band reflecting dichroic mirror 1424 tilted at +45 degrees and a red band reflecting dichroic mirror 1426 tilted at −45 degrees are embedded in the in the dichroic beam combiner 1412. The dichroic beam combiner 1412 may be made from multiple piece of optical glass that are coated with dichroic coatings and joined with optical cement. Light from the blue laser diode 1410 is coupled via the lower beam folding mirror surface 1418, the blue band reflecting dichroic mirror 1424 and the output surface 1422 to the output lens 1414a and 1414b. Similarly light from the red blue laser diode 1406 is coupled via the upper beam folding mirror surface 1420, the red band reflecting dichroic mirror 1426 and the output surface 1422 to the output lens 1414a and 1414b. Light from the green laser diode 1408 passes through the input surface 1416, the blue band reflecting dichroic mirror 1424, the red band reflecting dichroic mirror 1426 and the output surface 1422 to the output lens 1414a and 1414b.

Referring as well to FIG. 15, the third beam source 1502 includes a third output lens 1514a and the fourth beam source 1504 includes a fourth output lens 1514b. In FIG. 15 cross hairs indicate the center of the output lenses 1414a, 1414b, 1514a, and 1514b. The output lenses 1414a, 1414b, 1514a, and 1514b serve to: collect; alter the divergence angle (e.g., collimate); and deflect light emitted by the laser diodes 1406, 1408, and 1410. The optical path lengths for light from the red laser diode 1406 and the blue laser diode within the dichroic beam combiner 1412 is longer than the optical path length for light from the green laser diode 1408 as shown in FIG. 4. Additionally the output lenses 1414a, 1414b, 1514a, and 1514b may be simple refractive lenses made of a homogenous optical material and exhibit some chromatic aberration meaning that the output lenses 1414a, 1414b, 1514a, and 1514b have different focal lengths for light from the red, green and blue laser diodes 1406, 1408, and 1410. To compensate for the chromatic aberration and different path lengths within the dichroic beam combiner, each laser diode 1406, 1408, 1410 is set at a different distance from the input surface 1416 of the dichroic beam combiner 1412. As one example in cases where the output lenses 1414a, 1414b, 1514a, and 1514b are used to collimate light, each particular laser diode 1406, 1408, 1410 can be spaced from its associated output lens 1414a, 1414b, 1514a, and 1514b by an optical path distance equal to a back focal length specific to the peak wavelength of emission of the particular laser diode 1406, 1408, 1410.

The output lenses 1414a, 1414b, 1514a, and 1514b are displaced off-axis (by amounts identified in terms of increments ΔX and ΔY) with respect a combined optical axes 1415 for light from the laser diodes 1406, 1408, 1410. At the input to the lenses 1414a, 1414b, 1514a, and 1514b, the combined optical axis 1415 is parallel to the Z-axis indicated in FIG. 14. Offsetting the lenses 1414a and 1414b in the X and Y directions serves to induce a beam propagation direction that has non-zero X and Y direction cosines. Note that in the case of the first beam source 1402 the beam X and Y lens offsets are (ΔX, ΔY) whereas in the case of the second beam source 1404 the X and Y lens offsets are (−ΔX, ΔY). The antisymmetry of the X coordinate offsets serves to steer the light beams formed by the two beam sources 1402, 1404 to an intersection point 1428 which is coincident with the surface of the beam scanning mirrors used in the embodiments described hereinabove. Whereas the lenses 1414a and 1414b in pair of beam sources 1402, 1404 shown in FIG. 14 have a positive Y-axis offset with respect to the combined optical axis reaching the lenses 1414a and 1414b the second pair beam sources 1502, 1504 have a negative Y-axis offset (−_ΔY). Such an antisymmetry in the Y-axis offset serves to make the beams from the two pairs of beam sources 1402, 1404, 1502, 1504 meet at the aforementioned intersection point 1428. Thus four multispectral component, divergence controlled (e.g. collimated) beams can be directed at a single beam scanning mirror. The output lenses 1414a, 1414b, 15141, and 1514b may, by way of nonlimiting example, be glass or plastic, may be cemented achromats, compound lenses, and may include diffractive optical surfaces.

Figure 16:
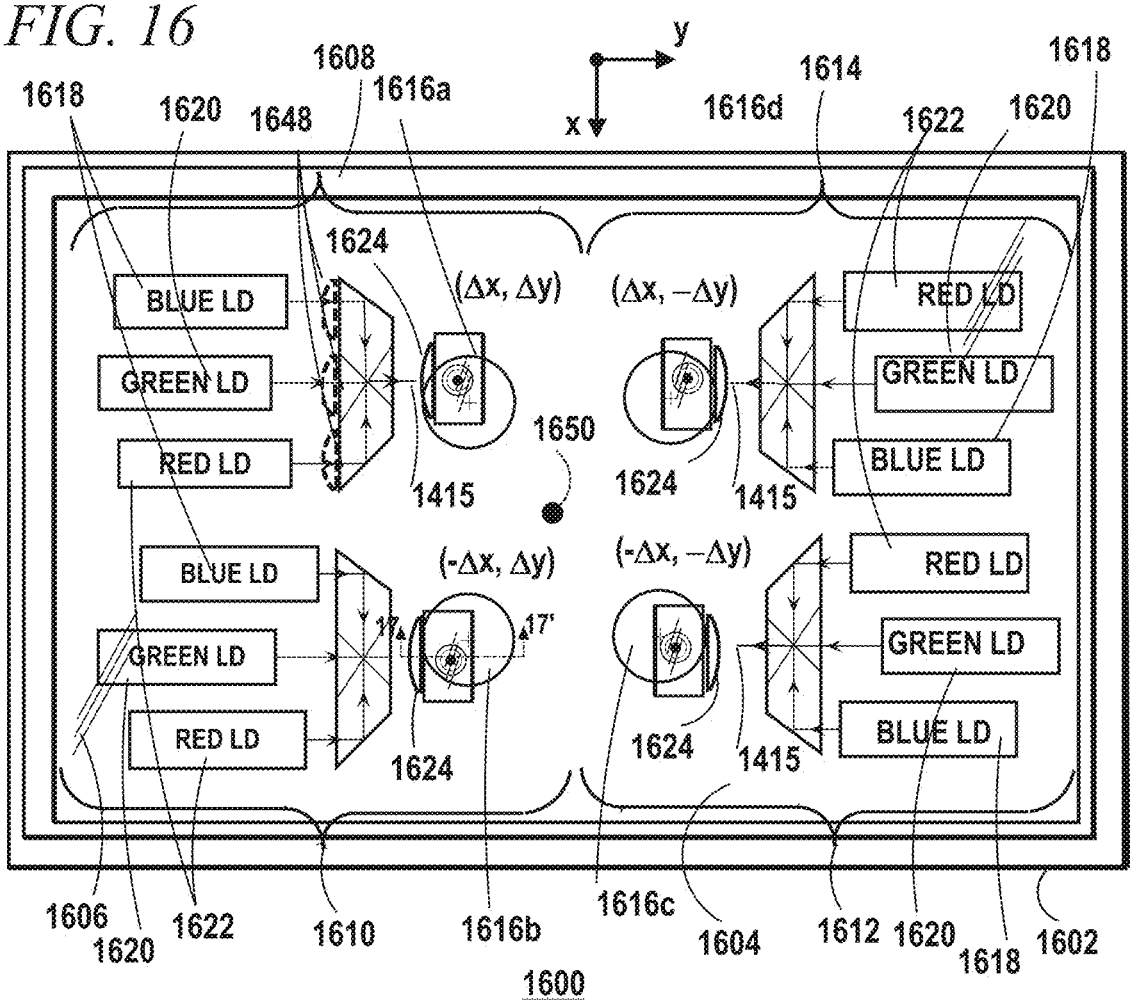
FIG. 16 is a top view of a four channel light engine according to a further embodiment of the present invention.
Figure 17:
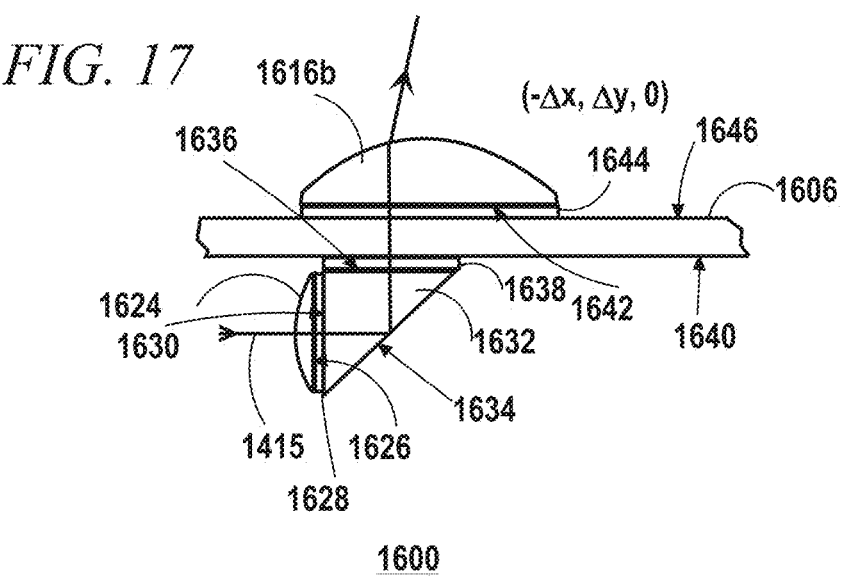
FIG. 17 is a cross-sectional view of a portion of the light engine shown in FIG. 16.

FIG. 16 is a top view of a four channel light engine 1600 according to an embodiment and FIG. 17 is a cross-sectional view of a portion of the light engine 1600 shown in FIG. 16. The light engine includes a substrate 1602 in which a recess 1604 is formed. The substrate 1602 can be, by way of nonlimitive example silicon or ceramic. The substrate 1602 is etched to form mounting bosses and locating features (not shown) for the components described below. If hermetic sealing is not required, then the substrate 1602 could be a fiberglass printed circuit board. Various optical components as described herein below are mounted in the recess 1604 and an optical window 1606 is sealed onto the substrate 1602 overlying and sealing the recess 1604. Four multispectral (RGB) component beam sources 1608, 1610, 1612, and 1614 are located in the recess 1604. With the exception of the offsetting of output lenses 1616a, 1616b, 1616c, and 1616d which is analogous to the embodiment described above with reference to FIGS. 14-15 and will be described below, the internal details of the beam sources 1608, 1610, 1612, and 1614 are the same. With reference to the first beam source 1608 shown in FIG. 16, a blue laser diode 1618, a green laser diode 1620 and a red laser diode 1622 are optically coupled via one of the dichroic beam combiners 1412 to a first lens 1624. Reference is made to the description hereinabove in the context of FIGS. 14-15 for a description of the internal details of the dichroic beam combiner 1412.

As shown in FIG. 17, which is a cross-section (as indicated in FIG. 16) through a portion of the second multispectral component beam source 1610, the first lens 1624 is a first plano convex lens having a planar surface 1626 bonded with an optical cement 1628 to an input surface 1630 of a beam folding prism 1632. A reflective surface 1634 of the beam folding prism 1632, deflects a beam exiting the dichroic beam combiner 1412 90 degrees upward toward the optical window 1606. The beam folding prism 1632 includes an exit surface 1636 bonded with an optical cement 1638 to a lower surface 1640 of the optical window 1606. A planar surface 1642 of a plano convex lens output lens 1616b is bonded, using an optical cement 1644 to an upper surface 1646 of the optical window 1606 overlying the exit surface 1636 of the beam folding prism 1632. Alternatively the first lens 1624 achieves a desired beam divergence change (e.g., collimation) and the plano convex output lenses 1616a, 1616b, 1616c, and 1616d are replaced with beam deflecting components such as prisms and or diffractive optical elements. As shown in the first multispectral component beam source 1608 alternatively divergence altering (e.g., collimating) lenses 1648 are positioned on the surface of the input surface 1416 of the dichroic beam combiner 1412. Alternatively, diffractive, catroptic, catodioptric, or other refractive components or subsystems may be used in lieu of or in addition to the first lens 1624, lenses 1648 and/or the output lenses 1616a, 1616b, 1616c, and 1616d. Each of the beam sources 1608, 1610, 1612, 1614 is equipped with one of the output lenses 1616a, 1616b, 1616c, and 1616d and each of the output lenses 1616a, 1616b, 1616c, and 1616d is offset transversely by amounts indicated in terms of distance increments $\Delta X$ and $\Delta Y$ with respect to the combined optical axis (transverse beam centroid) 1415 of its beam source 1608, 1610, 1612, 1614. In this manner the beams output from the four beam sources 1608, 1610, 1612, 1614 are caused to intersect at a common intersection point 1648 1650 which can be positioned at the surface of one of the beam scanning mirrors of the embodiment described hereinabove. Thus four multispectral component beams each having independently modulated red, green and blue spectral components can be impinged on a single scanning mirror and scanned by the scanning mirror over input optical elements (e.g., input coupling diffraction gratings) of a display waveguide. The scanning mirror can be driven to scan each multicomponent beam over a sufficient angular range that is at least equal to half the angular separation between the multicomponent beams incident on the scanning mirror and in this manner each the beam can be scanned over a subranges that join to (at least) contiguously fill a larger solid angle range. (Overlapping the subranges are also possible.) Such a larger solid angle range corresponds to a larger field of view for a user looking into a waveguide display eyepiece into which the beams or input. Each laser diode within each beam source can be separately modulated with image data forming color imagewise modulated light.

Figure 18:
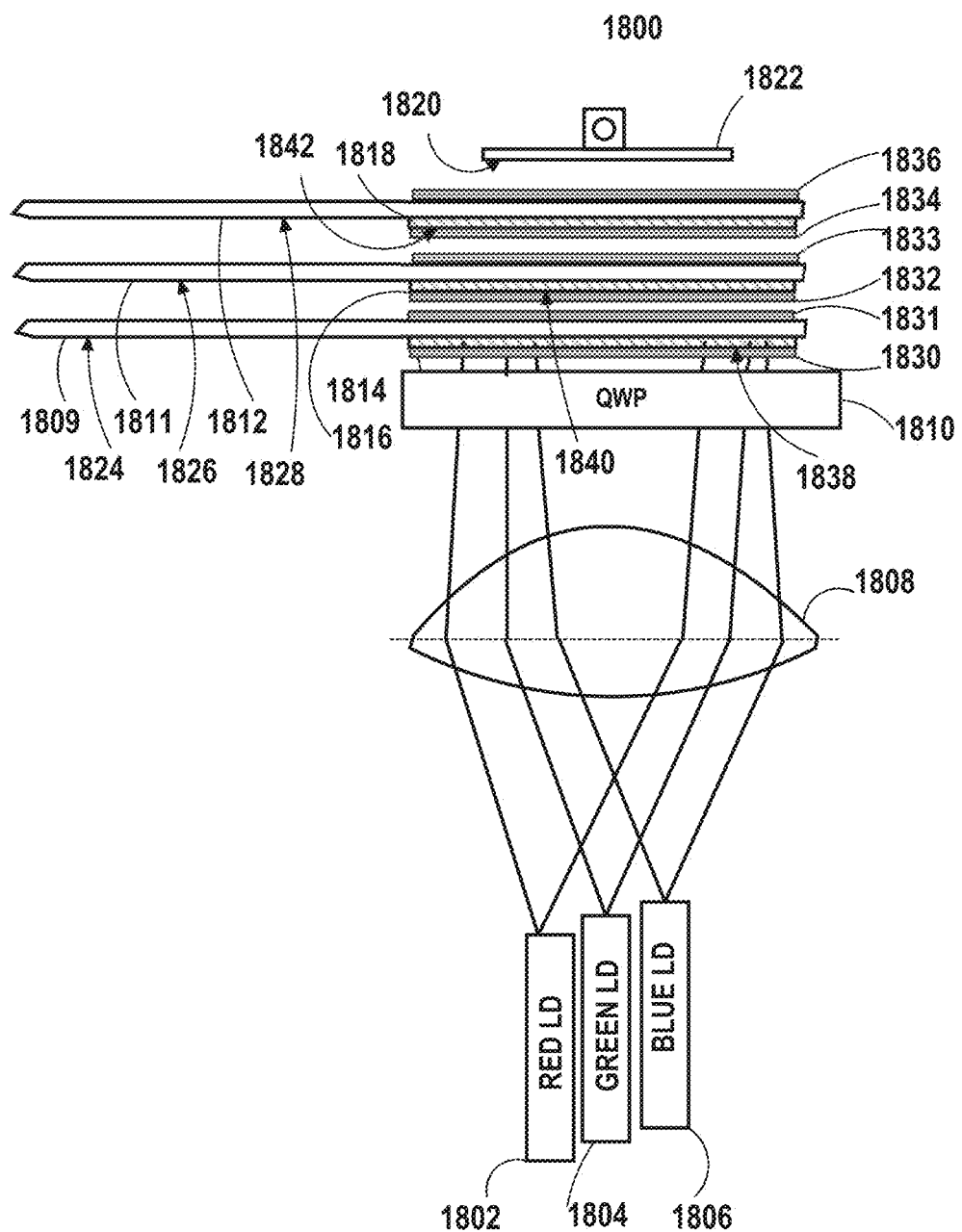
FIG. 18 is a fragmentary view of a waveguide display system according to an embodiment of the present invention.

FIG. 18 is a fragmentary view of a waveguide display system 1800 according to an embodiment. As shown in FIG. 18 the waveguide display system includes a red laser diode 1802, a green laser diode 1804 and a blue laser diode 1806 having light emission directions facing a biconvex aspheric collimating lens 1808. Alternatively another type of collimating optic or optical system, such as by way of nonlimitative example compound lenses, diffractive, catroptic and/or catodioptric components may be used. Light collimated by the lens 1808 is incident on a quarter wave plate (QWP) 1810. In as much as light emitted by the laser diodes 1802, 1804, 1806 is substantially linearly polarized, the QWP 1810 serves to convert the polarization state to either right hand (RH) or left hand (LH) circularly polarized light. Light exiting the QWP 1810 passes through a first blue antireflection (AR) coating 1830, a blue incoupling grating (ICG) 1814, a blue light waveguide 1809, a second blue AR coating 1831, a first green AR coating 1832, a green ICG 1816, a green light waveguide 1811, a second green AR coating 1833, a first red AR coating 1834, a red ICG 1818, a red waveguide 1812 and a second red AR coating 1836. The ICGs 1814, 1816, and 1818 are suitably reflective Cholesteric Liquid Crystal Gratings (CLCG). The structure of the incoupling CLCGs 1814, 1816, 1818 is discussed in more detail below. The blue ICG 1814 is supported on a front side 1824 of the blue light waveguide 1809, the green ICG 1816 is supported on a front side 1826 of the green light waveguide 1811 and the red ICG 1816 is supported on a front side 1828 of the red waveguide 1812. The front sides 1824, 1826, 1828 of the waveguides 1809, 1811, 1812 face toward from the laser diodes 1802, 1804, and 1806. The first blue AR coating 1830, the first green AR coating 1832 and the first red AR coating 1834 are disposed respectively on a laser facing surface 1838 of the blue ICG 1814, a laser facing surface 1840 of the green ICG 1816, and a laser facing surface 1842 of the red ICG 1818.

Only a portion of the waveguides 1809, 1811, 1812 is visible in FIG. 18. Remaining portions of the waveguides 1809, 1811, 1812 include or have formed thereon additional optical components for controlling the coupling of light to a user's eye. Such additional components can include, for example, orthogonal pupil expansion gratings (OPE), and exit pupil expansion gratings (EPE). The waveguides 1809, 1811, 1812 are transparent so as to allow the user to simultaneously see virtual content and the real surroundings. After passing through the waveguides 1809, 1811, and 1812 and the ICGs 1814, 1816, and 1818 light emitted by laser diodes 1802, 1804, and 1806 is reflected at a front surface 1820 of a scanning mirror 1822. When the light initially passes through the QWP 1810 the light is converted from linear polarization to a specific initial handedness of circularly polarized light which may be LH or RH. The ICGs 1814, 1816, and 1818 have a handedness opposite of the initial handedness of the light so that the light initially passes through the ICGs substantially without deflection. The front surface 1820 of the scanning mirror 1822 may be specular or include a reflective diffraction grating (e.g., a blazed surface relieve grating, or volume holographic grating, for example) which redirects the light into a non-zero diffraction order. Upon reflection from the front surface 1820 that handedness of the circular polarization is reversed so as to match the handedness of the CLCG ICGs 1814, 1816, and 1818 and therefore the light reflected from the front surface 1820 of the scanning mirror 1822 is reflectively diffracted into a first diffraction angle that is above the critical angle for TIR in the waveguides 1809, 1811, 1812.

Figure 19:
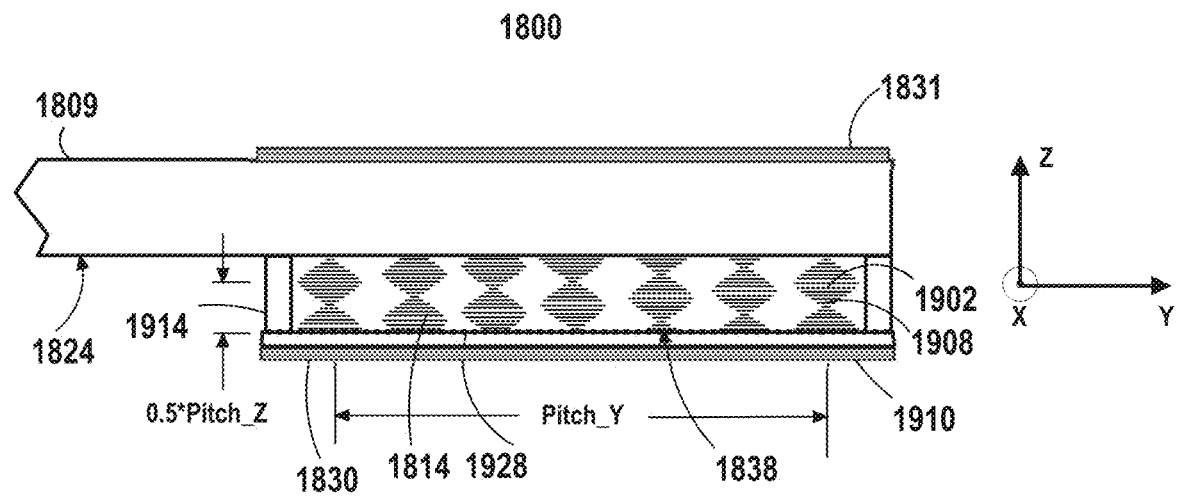
FIG. 19 is a cross-sectional elevation view through, blue AR coatings, a blue ICG and a blue waveguide of the waveguide display system shown in FIG. 19.

FIG. 19 is a cross-section view through a portion of the waveguide display system 1800 shown in FIG. 18. FIG. 19 includes a cross-sectional elevation view through the blue AR coatings 1830, 1831, blue ICG 1814 and blue waveguide 1809, and includes internal details of the blue ICG 1814. The green ICG 1816 and the red ICG 1818 have a structure that is analogous to the structure of the blue ICG 1814, albeit with different axial and lateral pitches which are discussed further below. The blue ICG 1814 includes a cholesteric liquid crystal material 1902 located in a first cell 1908 formed by a first substrate 1910, a second substrate 1912 and a first edge seal 1914. The first cell 1908 includes an alignment layer 1928 formed on the first substrate 1910. A cholesteric liquid crystal includes a stack of multiple strata of liquid crystal material. Assuming, as in the case of FIG. 19, that the stacking direction corresponds to Z direction of the illustrated Cartesian triad, the orientation of the molecules in each successive layer in the stack is rotated by a small angular increment about the Z axis. The rotation about the Z axis is characterized by a pitch, which is the Z distance corresponding to one full rotation of the molecules. Chiral dopant molecules can be added to control the direction of the twist which can be either a left handed twist or a right handed twist. Reflectivity is maximized for light that has a circular polarization that matches the handedness of the twist of the cholesteric liquid crystal and has a wavelength that matches the Z direction pitch. The pitch characterizing the rotation of molecules about the Z axis for the blue CLCG is indicated by the label dimension 0.5*Pitch_Z which is equal to one-half the pitch in FIG. 19.

A grating can be created by establishing a periodic lateral (e.g., X direction in FIG. 9) change in the orientation of molecules in each layer. The alignment layer 1928 is used to establish the lateral changes in the orientation of the cholesteric liquid crystal. The alignment layer 1928 may be a photo-alignment layer in which patterns for establishing the local alignment of the liquid crystal molecules are established by exposing to patterns of polarized light. Examples of photo-alignment layers include polyimide, linear-polarization photopolymerizable polymer (LPP), azo-containing polymers, courmarine-containing polymers and cinnamate-containing polymers. The lateral pitch of the liquid crystal material 1902 is labeled Pitch_X in FIG. 19. The liquid crystal material 1902 forms a reflective polarization handedness selective grating that preferentially diffracts light into the first diffraction order. The vertical pitch for the liquid crystal materials 1902 is set according to the wavelength of light it is intended to reflect (e.g., the wavelength of light emitted by the blue laser diode 1806). The lateral pitch Pitch_X is set according to the grating equation to establish the angle of diffraction of the first order diffracted light. In the context of the waveguide display system 1800 the lateral pitch of the liquid crystal material 1902 is chosen such that the angle of diffraction from the liquid crystal material 1902 for all orientations of the scanning mirror 1822 exceeds the critical angle for total internal reflection for the waveguide 1812. It should be understood that the references to "vertical" and "lateral" in regard to the pitches Pitch_X and Pitch_Z are applicable to the orientation of the system 1800 shown in FIG. 19 and that in practice the system 1800 can be used in any orientation. Analogous to what is shown in FIG. 19, the green incoupling grating 1816 and the red incoupling grating 1818 will have a vertical pitch Pitch_Z corresponding to the wavelength of light with which they are to work, (e.g., the wavelength emitted by the red laser diode 1802 and the green laser diode 1806) and will have a lateral pitch Pitch_X based on the wavelength with which they are to work and in view of the specification that light be diffracted at an angle that exceeds the critical angle for TIR within the respective waveguides 1811 and 1812.

Figure 20:
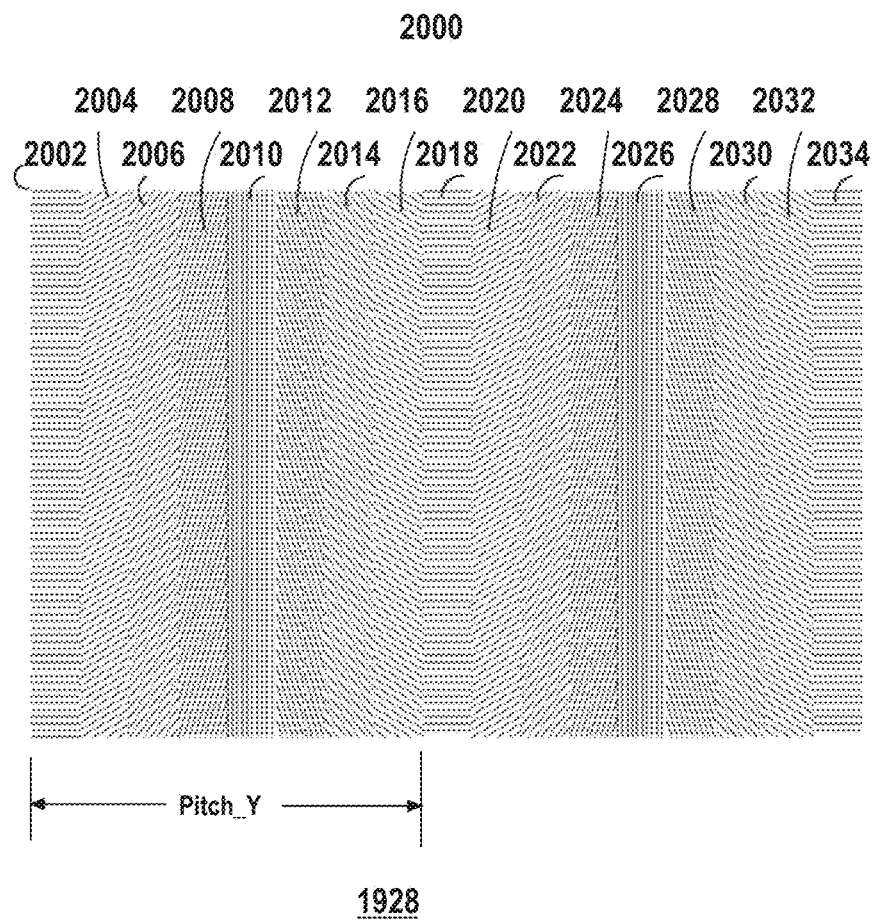
FIG. 20 is a schematic plan view representation of a first alignment layer used in one of the incoupling gratings shown in FIG. 19 according to an embodiment of the present invention.

FIG. 20 is a schematic plan view representation of the first alignment layer 1928 according to an embodiment. As shown in FIG. 20 the alignment layer 1928 includes a series strip shaped areas 2002-2034. It should understood that the view shown in FIG. 20 shows just over two periods (denoted Pitch_X) and in practice the first alignment layer 1928 will include a greater number of pitch periods. Within each pitch period (Pitch_X) each successive strip area (e.g. 2002-2016) has an alignment direction that is incremented relative to a preceding strip area. As shown in FIG. 20 there are eight strip shaped areas each with a different alignment direction per pitch period. Alternatives such as for example four or sixteen strip shaped areas, each with a different alignment direction may be provided per pitch period. Alternatively the alignment direction can vary continuous. Continuous variation can be obtained by exposing a photo-alignment material such as, for example, the above cited photo-alignment materials to an interference pattern produced by the interference of two beams having opposite handedness circular polarization. The amplitude sum of opposite handedness circular polarization beams is linearly polarized and the orientation of the linearly polarized sum varies as a function of the phase difference and hence varies across the photo-alignment layer.

Figure 21:
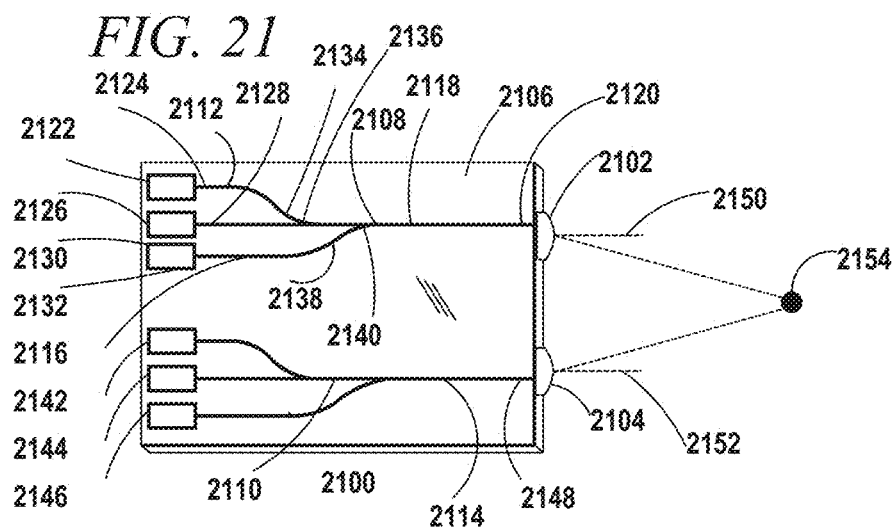
FIG. 21 is a top view of a photonic chip based two RGB color channel combiner and associated lenses according to one embodiment of the present invention.

FIG. 21 is a top view of a photonic chip based two RGB color channel combiner 2100 and first lens 2102 and second lens 2104 according to one embodiment. The combiner 2100 includes a glass slab 2106 in which a first branched waveguide 2108 and a second branched waveguide 2110 are defined. The branched waveguides 2108, 2110 can be defined by patternwise alteration of the index of refraction of the glass slab. The alteration of the index of refraction can be accomplished by implanting or infusing non-native atomic species, e.g., through a mask pattern.

The first branched waveguide 2108 has a first red receiving branch 2112, and a first blue receiving branch 2116 which are coupled to a trunk 2118. A first red laser diode 2122 is optically coupled to an input end 2124 of the first red receiving branch 2112; a first green laser diode 2126 is optically coupled to and input end 2128 of the trunk 2118; and a first blue laser diode 2130 is optically coupled to an input end 2132 of the first blue receiving branch 2116. An output end 2134 of the first red receiving branch 2112 is coupled to the trunk 2118 at a first Y junction 2136. Similarly an output end 2138 of the first blue receiving branch 2116 is coupled to the trunk 2118 at a second Y junction 2140

The second branched waveguide 2110 has the same structure as the first branched waveguide 2108 as described above and serves to couple light from a second red laser diode 2142, a second green laser diode 2144 and a second blue laser diode 2146 to an output end 2148 of a trunk 2114 the second branched waveguide 2110.

The first lens 2102 is positioned in front of and optically coupled to the output end 2120 of the trunk 2118 (and hence of the first branched waveguide 2108) and the second lens 2104 is positioned in front of and optically coupled to the output end 2148 of the second branched waveguide 2110. A first lens optical axis (e.g., axis of rotational symmetry) 2150 of the first lens 2102 and a second optical axis 2152 of the second lens 2104 are shown in FIG. 21. The first lens optical axis 2150 is offset downward (in the perspective of FIG. 2) and in the direction normal to the plane of the drawing sheet relative to the trunk 2118 of the first branched waveguide 2108. Similarly the second lens optical axis 2152 is offset upward and in the direction normal to the plane of the drawing sheet relative to the trunk 2114 of the second branched waveguide 2110. The aforementioned offsets of the lens optical axes 2150, 2152 serve to direct light emanating from the output ends 2120 2148 of the trunks 2118, 2114 to a common intersection point 2154 which is arranged coincident with the surface of one of the beam scanning mirrors (e.g., 330, 730) used in the embodiments described hereinabove.

Figure 22:
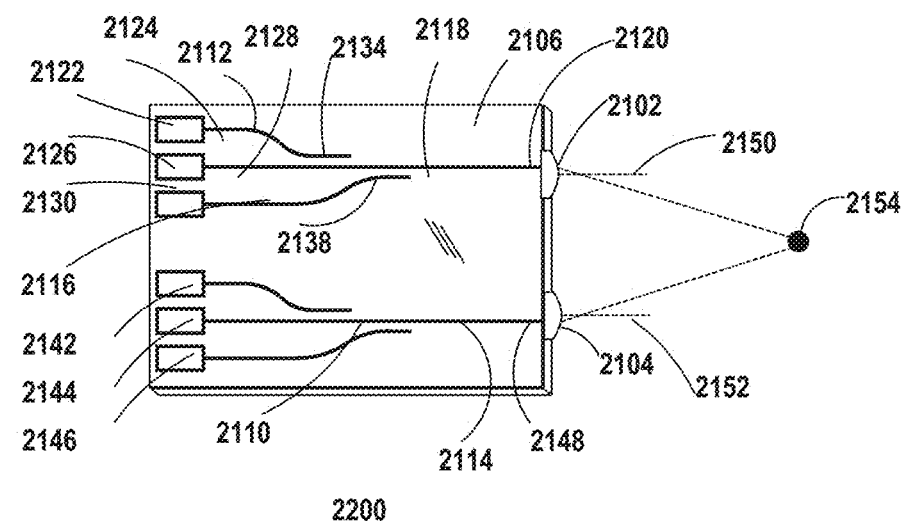
FIG. 22 is a top view of a photonic chip based two RGB color channel combiner and associated lenses according to another embodiment of the present invention.

FIG. 22 is a top view of a photonic chip based two RGB color channel combiner 2200 according to another embodiment. The combiner 2200 has numerous elements in common with the combiner 2100 as indicated by common reference numerals. The combiner 2200 differs from the combiner 2100 in that the output end 2134 of the red receiving branch 2112 and the output end of the blue receiving branch 2116 are coupled to the trunk 2118 by evanescent coupling in lieu of the Y junctions 2136 and 2140.

Figure 23:
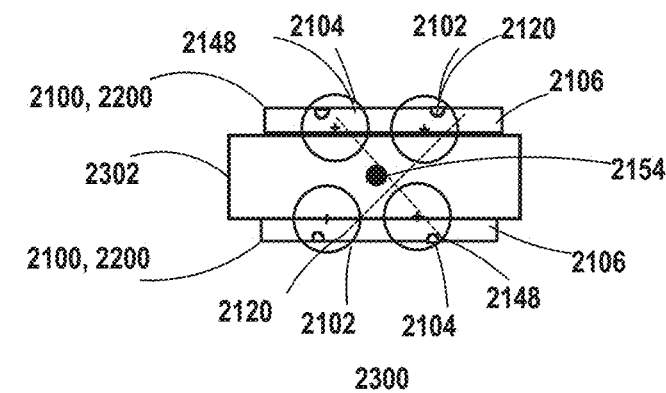
FIG. 23 is front view of a four RGB channel light engine that includes two of the two of the combiners shown in FIG. 21 and/or FIG. 22 according to an embodiment of the present invention.

FIG. 23 is front view of a four RGB channel light engine 2300 that includes two of the combiners 2100 and/or 2200 shown in FIGS. 21-22 according to an embodiment. A top position combiner 2100, 2200 and a bottom position combiner 2100, 220 are positioned on opposite sides of a spacer block 2300. As shown the lenses 2102, 2104 are offset relative to their associated trunk output ends 2120, 2148 such that light emanating from the output ends 2120, 2148 of the trunks 2118, 2114 is converged to the common intersection point 2154 which will be located coincident with the surface of one of the beam scanning mirrors (e.g., 330, 730) when the light engine 2300 is used in the embodiments described hereinabove.

Figure 24:
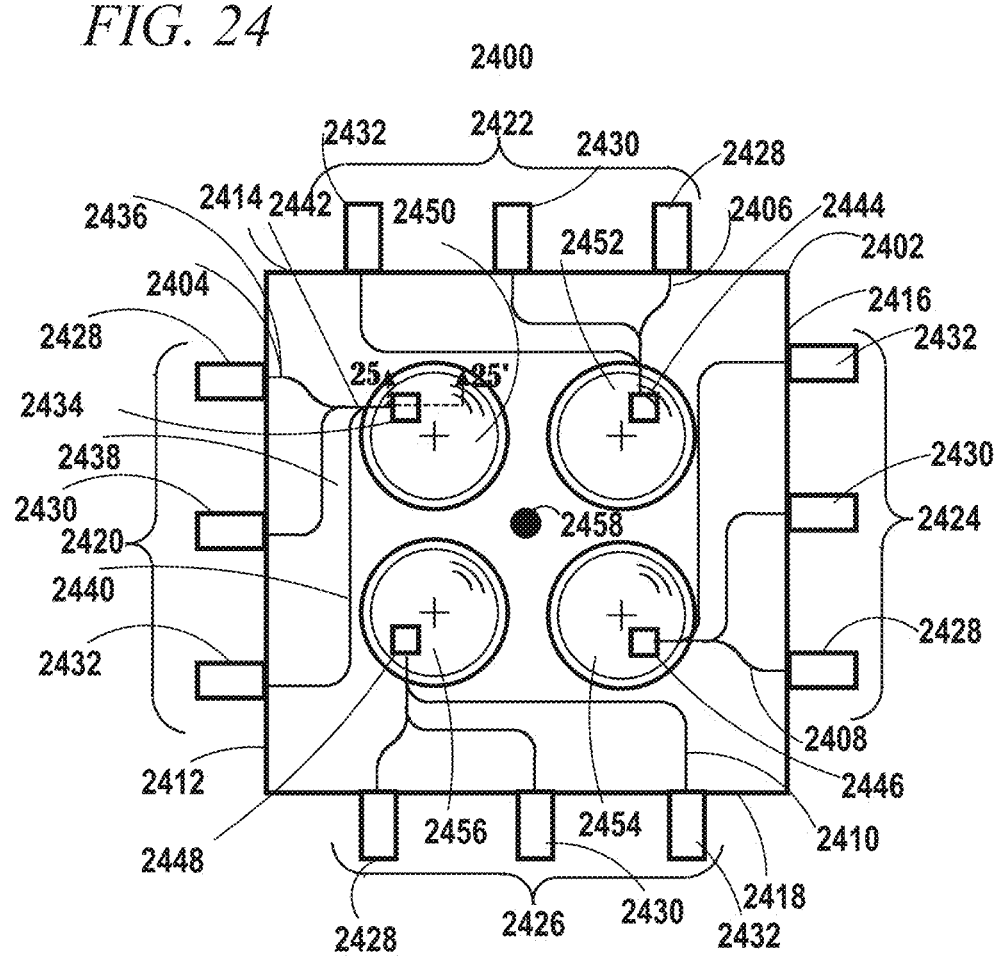
FIG. 24 is a top view of a four RGB channel light engine according to an embodiment of the present invention.
Figure 25:
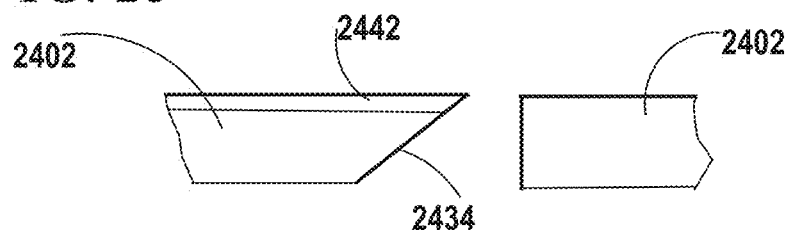
FIG. 25 is a fragmentary cross sectional elevation view of a portion of the four RGB channel light engine shown in FIG. 24 of the present invention.

FIG. 24 is a top view of a four RGB channel light engine 2400 according to another embodiment and FIG. 25 is a fragmentary cross sectional elevation view of a portion of the four RGB channel light engine 2400 shown in FIG. 24. The light engine 2400 includes a glass slab 2402 in which a first branched waveguide 2404, a second branched waveguide 2406, a third branched waveguide 2408 and a fourth branched waveguide 2410 are defined. The branched waveguides, 2404, 2406, 2408, 2410 may be established in the manner discussed above with reference to the embodiment shown in FIG. 21. As shown the slab 2402 is square and includes a first side 2412, a second side 2414, a third side 2416 and a fourth side 2418. Alternatively shaped glass slabs 2402 may also be used. A first set of red, green and blue (RGB) laser diodes 2420 is arranged along the first side 2412, a second set of RGB laser diodes 2422 is arranged along the second side 2414, a third set of RGB laser diodes 2424 is arranged along the third side 2416 and a fourth set of RGB laser diodes 2426 is arranged along the fourth side 2418.

The first set of RGB laser diodes 2420 includes a red laser diode 2428, a green laser diode 2430 and a blue laser diode 2432. The first branched waveguide 2404 is positioned adjacent to the first side 2412 and serves to couple light from the first set of RGB laser diodes 2420 to a first outcoupling facet 2434. The first branched waveguide 2404 includes a red light receiving branch 2436 optically coupled to the red laser diode 2428, a green light receiving branch 2438 optically coupled to the green laser diode 2430 and a blue light receiving branch 2440 optically coupled to the blue laser diode 2432. The red, green and blue light receiving branches 2436, 2438, 2440 connect (or alternatively evancescently coupled) to a trunk 2442 of the first branched waveguide 2404. The trunk 2442 extends to the first outcoupling facet 2434. The outcoupling facet 2434 is total internal reflection (TIR) surface angled at 45 degrees relative to the orientation of the trunk 2442. The first outcoupling facet 2434 reflectively deflects light out of the plane of the glass slab 2402.

The second, third and fourth branched waveguides 2406, 2408, 2410 have the same structure as that of the first branched waveguide as described 2404 but are rotated relative thereto to align with respective sides 2414, 2416, 2418 adjacent to which they are positioned. The second, third and fourth branched waveguides 2406, 2408, and 2410 respectively couple to a second outcoupling facet 2444, a third outcoupling facet 2446 and a fourth outcoupling facet 2448. A first lens 2450, a second lens 2452, a third lens 2454 and a fourth lens 2456 are respectively positioned over the first outcoupling facet 2434, the second outcoupling facet 2444, the third outcoupling facet 2446 and the fourth outcoupling facet 2448. Each of the lenses 2450, 2452, 2454, 2456 is offset relative to the outcoupling facets that it overlies towards a median position between the outcoupling facets 2434, 2444, 2446, and 2448. Accordingly the lenses 2450, 2452, 2454, and 2456 serve to direct light emanating from the outcoupling facets 2434, 2444, 2446, and 2448 to a common to an intersection point 2458 which is coincident with the surface of one of the beam scanning mirrors (e.g., 330, 730) used in the embodiments described hereinabove. The intersection point 2458 is spaced above the glass slab although this is not evident in the plan view perspective of FIG. 24. According to an alternative, laser diodes emitting at other wavelengths and associated light receiving branches are added to the light engine 2400 such that the light engine 2400 will provide more than three (RGB) wavelength channels. For example the additional channel could be infrared light that is useful in providing illumination for an eye tracking system.

Figure 26:
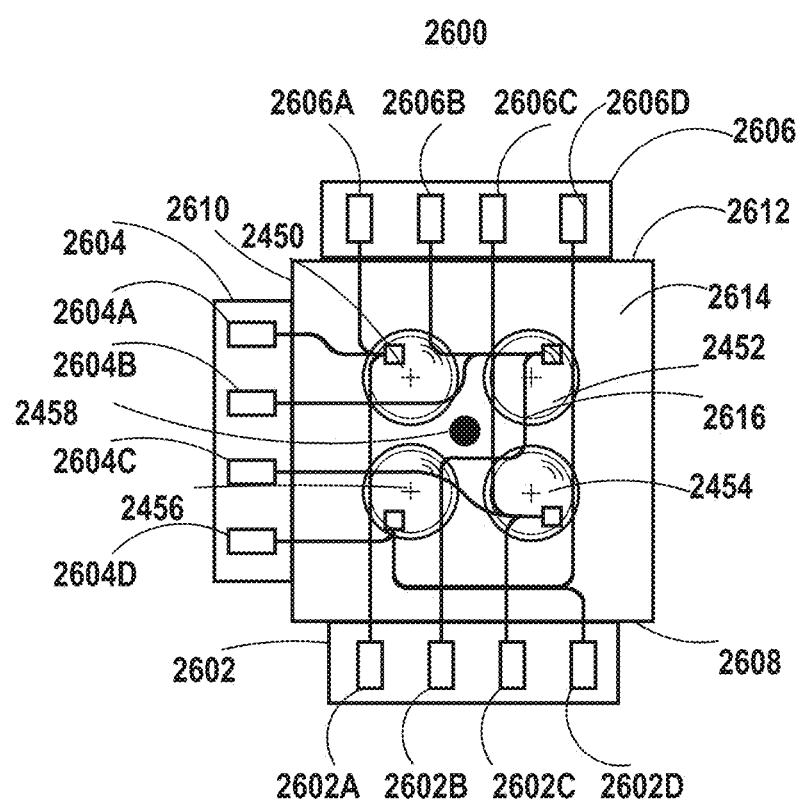
FIG. 26 is a top view of a four RGB channel light engine according to another embodiment of the present invention.

FIG. 26 is a top view of a four RGB channel light engine 2600 according to another embodiment. A red laser bar 2602, a green laser bar 2604 and a blue laser bar 2606 are arranged, respectively, proximate a red input side 2608, a green input side 2610, and a blue input side 2612 of glass slab 2614 in which a network of waveguides 2616 is formed. The red laser bar 2602 includes four separately controllable red laser diodes 2602A, 2602B, 2602C, and 2602D and similarly the green laser bar 2604 includes four separately controllable green laser diodes 2604A, 2604B, 2604C, and 2602D and similarly the blue laser bar 2606 includes four separately controllable blue laser diodes 2606A, 2606B, 2606C, and 2606D. Four output facets 2608A, 2608B, 2608C and 2608D are defined in the glass slab 2614. The output facets 2608A, 2608B, 2608C, and 2608D have the same design as that of the output facet 2434 shown in FIG. 25 or alternatively a different design. One of the separately controllable laser diodes from each of the laser bars 2602, 2604, 2606 is coupled to each of the output facets 2608A, 2608B, 2608C, and 2608D through the network of waveguides 2616. Lens 2450, 2452, 2454, 2456 are positioned over output facets 2608A, 2608B, 2608C, and 2608D and function as described above in connection with FIG. 24. According to an alternative embodiment another laser bar which may operate at a different wavelength (e.g., infrared) may be positioned along the fourth side of the glass slab 2614 and optically coupled to the output facets 2608A, 2608B, 2608C, and 2608D via the network of waveguides 2616 which may be extended for such purpose.

Figure 27:
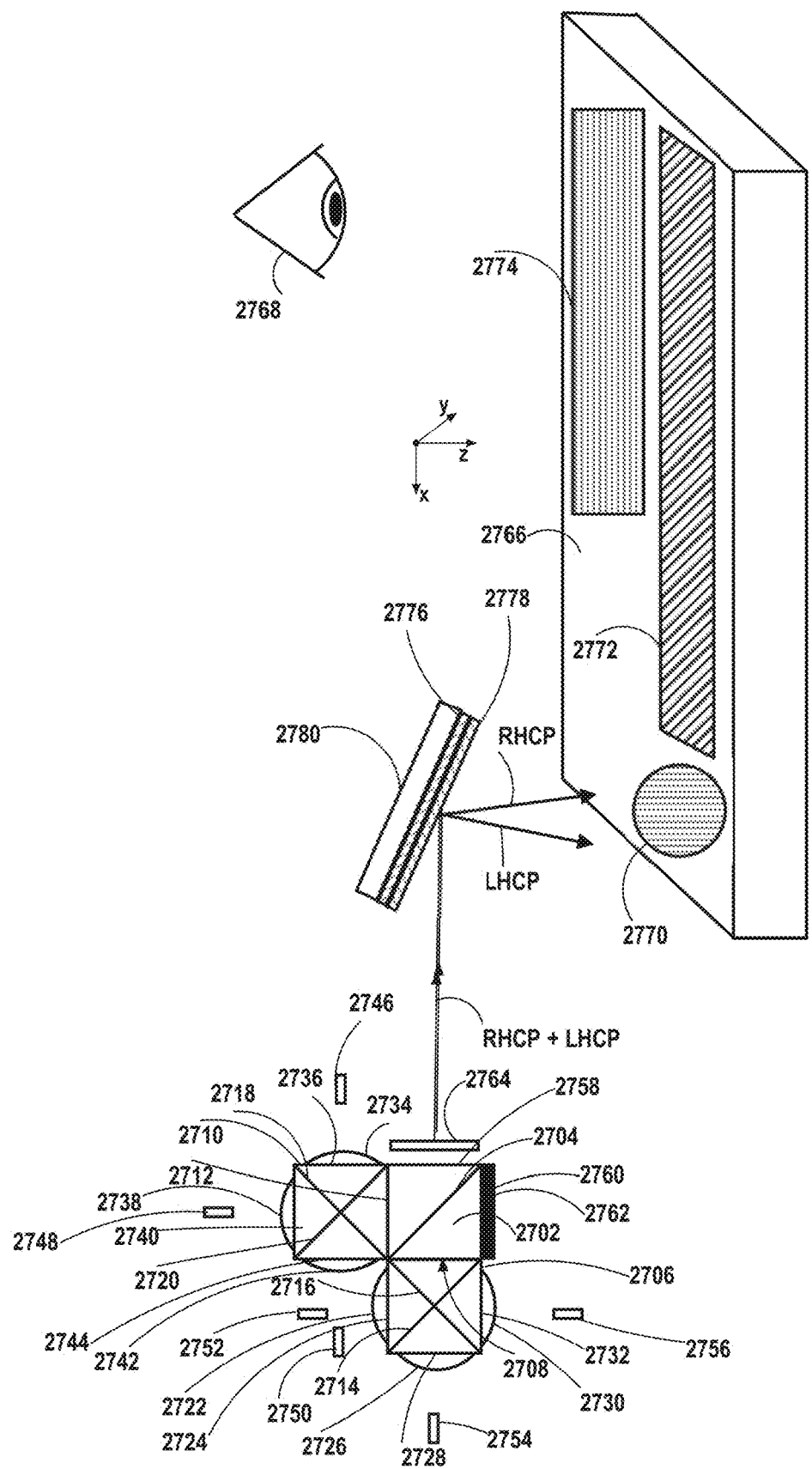
FIG. 27 is a schematic illustration of a waveguide display system that may be used in augmented reality glasses according to an embodiment of the present invention.

FIG. 27 is a schematic illustration of a waveguide display system 2700 that may be used in augmented reality glasses according to an embodiment of the present invention. Referring to FIG. 27, the system includes a polarization beam splitter (PBS) 2702, which in the present case is used a polarization beam combiner. The PBS 2702 includes a polarization selective reflector 2704 embedded along a diagonal of the PBS 2702. The polarization selective reflector 2704 can be a wire grid array or a MacNeille type, for example.

A first dichroic X-cube combiner 2706 is arranged adjacent to a first face 2708 of the PBS 2702 and a second dichroic X-cube combiner 2710 is arranged adjacent to a second face 2712 of the PBS 2702. The first dichroic X-cube combiner 2706 includes a first embedded red reflecting dichroic mirror 2714 along a first diagonal and a first embedded blue reflecting dichroic mirror 2716 along a second diagonal that intersects the first diagonal at 90 degrees. The second dichroic X-cube combiner 2710 similarly has an embedded second red reflecting dichroic mirror 2718 along one diagonal and a second embedded blue reflecting dichroic mirror 2720 along a second diagonal. Alternatively, in lieu of the X-cube combiner 2706, 2710 other optical subsystems for combining light from multiple laser diodes may be used. For example components like the RGB color channel combiner shown in FIG. 21 and FIG. 22 above may be used.

With reference to the first dichroic X-cube combiner 2706, a first red light collimating lens 2722 is arranged proximate a first red light input face 2724, a first green light collimating lens 2726 is arranged proximate a first green light input face 2728 and a first blue light collimating lens 2730 is arranged proximate a first blue light input face 2732 of the first dichroic X-cube combiner 2706. With reference to the second dichroic X-cube combiner 2710, a second red light collimating lens 2734 is arranged proximate a second red light input face 2736, a second green light collimating lens 2738 is arranged proximate a second green light input face 2740 and a second blue light collimating lens 2742 is arranged proximate a second blue light input face 2744 of the second X-cube combiner 2710.

In the following discussion the s-polarized and p-polarized orientations are defined in terms of light incidence at the polarization selective reflector 2704. Referring again to FIG. 27, an s-polarized red laser diode 2746 is arranged facing the first red light collimating lens 2722 and first red input face 2724; an s-polarized green laser diode 2748 is arranged facing the first green light collimating lens 2726 and first green input face 2728; and an s-polarized blue laser diode 2750 is arranged facing the first blue light collimating lens 2730 and first blue light input face 2732 of the first dichroic x-cube combiner 2706. Similarly a p-polarized red laser diode 2752 is arranged facing the second red light collimating lens 2734 and the second red light input face 2736; a p-polarized green laser diode 2754 is arranged facing the second green light collimating lens 2738 and the second green light input face 2740; and a p-polarized blue laser diode 2756 is arranged facing the second blue light collimating lens 2742 and second blue light input face 2744 of the second dichroic x-cube combiner 2710. The polarization of the aforementioned laser diodes can be determined simply by determining the orientation in which they are mounted. The aforementioned laser diodes are modulated based pixel color intensity values for a succession of pixels. As will be explained further below, the s-polarized laser diodes 2746, 2748, 2750 illuminate a first portion of a field of view produced by the waveguide display system 2700 and the p-polarized laser diodes 2752, 2754, 2756 illuminate a second portion of the field of view produced by the waveguide display system 2700. Although the collimating lenses 2722, 2726, 2732, 2734, 2738, 2742 are depicted as plano convex, alternatively they may be bi-convex or have another shape.

The first dichroic x-cube combiner 2706, by the effect of the first embedded red and blue dichroic reflecting mirrors 2714, 2716, combines the light from the s-polarized laser diodes 2746, 2748, 2750 into a collimated s-polarized red-blue-green (RGB) beam that passes from the first dichroic x-cube combiner 2706 into the first face 2708 of the PBS 2702. Similarly the second dichroic x-cube combiner 2710, by the effect of the second embedded red and blue dichroic reflecting mirrors 2718, 2720 combines the light from the p-polarized laser diodes 2752, 2754, 2756 into a collimated p-polarized RGB beam that passes from the second dichroic x-cube combiner 2710 into the second face 2712 of the PBS 2702.

The polarization selective reflector 2704 is oriented so as to reflect the collimated s-polarized RGB beam that arrives from the first face 2708 and transmit the collimated p-polarized RGB beam that arrives from the second face 2712 thereby forming a combined s-polarized RGB and p-polarized RGB beam that is output via a third face 2758 of the PBS 2702. A stray light absorber 2760 is positioned proximate a fourth face 2762 of the PBS 2702 and serves to absorb any p-polarized light that is reflected by the polarization selective reflector 2704 and any s-polarized light that is transmitted by the polarization selective reflector 2704 due to non-ideal performance of the polarization reflector 2704.

After passing through the third face 2758 of the PBS 2702 light passes through a quarter wave plate (QWP) 2764. The PBS one of the polarization component (S or P) to right hand circularly polarized (RHCP) light and converts the remaining polarization component (P or S) to left hand circularly polarized (LHCP) light. Which linear polarization component is converted to which circular polarization component can be altered by rotating the QWP 2764. The output of the QWP includes an RHCP RGB beam and an LHCP RGB beam which are derived from the s-polarized RGB beam and the p-polarized RGB beam. Assuming, for the purpose of discussion that the s-polarized light is converted to RHCP light and the p-polarized light is converted to LHCP light, the RHCP light will illuminate the above mentioned first portion of the FOV and the LHCP will illuminate the above mentioned second portion of the FOV produced by the system 2700.

The system 2700 further includes a waveguide 2766 used to transfer imagewise modulated light the user eye position 2768. An in-coupling grating (ICG) 2770, an orthogonal pupil expansion (OPE) grating 2772, and an exit pupil expansion (EPE) grating 2774. Substantially collimated light is input through the ICG and deflected by the ICG 2770 toward the OPE grating 2772. The OPE grating 2772 incrementally deflects portions of the light toward the EPE grating 2774 and in so doing increase the transverse width (x-direction in FIG. 27) of the collimated beam. An X-Y-Z coordinate triad is shown in FIG. 27 for reference. The EPE grating 2774 incrementally diffracts light out toward the direction of the user's eye position 2768 and in so doing increase the y-direction extent of the collimated beam. By the beam expansion effect of the OPE and EPE gratings 2772, 2774 a relatively large exit pupil (eye box) is formed which helps to insure that light will be coupled into the user's pupil which may move about as the user looks in different directions.

Along an optical path between the QWP 2764 and the ICG 2770 there is a two axis scanning mirror 2780. The scanning mirror 2780 can for example be a microelectromechanical system (MEMS) mirror. One scanning mirror movement may be resonant in one degree of freedom and quasi-statically controlled in a second degree of freedom. For example the resonant axis may correspond to movement analogous to movement along lines of a display and the quasi-statically controlled second degree of freedom may correspond to movement analogous to vertical movement between lines of a display. For relatively high resolution imagery it is desirable to have the equivalent of 1000 or 2000 scan lines for example and a frame refresh rate of 30 to 60 frames per second. Such parameters call for a line rate of 30 KHz to 120 KHz. For small MEMS scanners that are small enough to be included in augmented reality wearables there is generally a tradeoff between the angular range of the resonant axis (which relates to the field of view (FOV)) and the resonant frequency (which equates to the line rate). It would be desirable to circumvent this tradeoff and attain both a wide field of view and a high line rate.

In the system 2700 the FOV is increased through the provision of the portions of the system 2700 described above in combination with two different types of polarization selective gratings. In the system 2700, a set of left handed (LH) reflective liquid crystal gratings 2776 and a set of right handed (RH) reflective liquid crystal gratings 2778 are disposed on the two axis scanning mirror 2780. The sets of reflective liquid crystal gratings 2776 and 2778 will be described further below.

Figure 28:
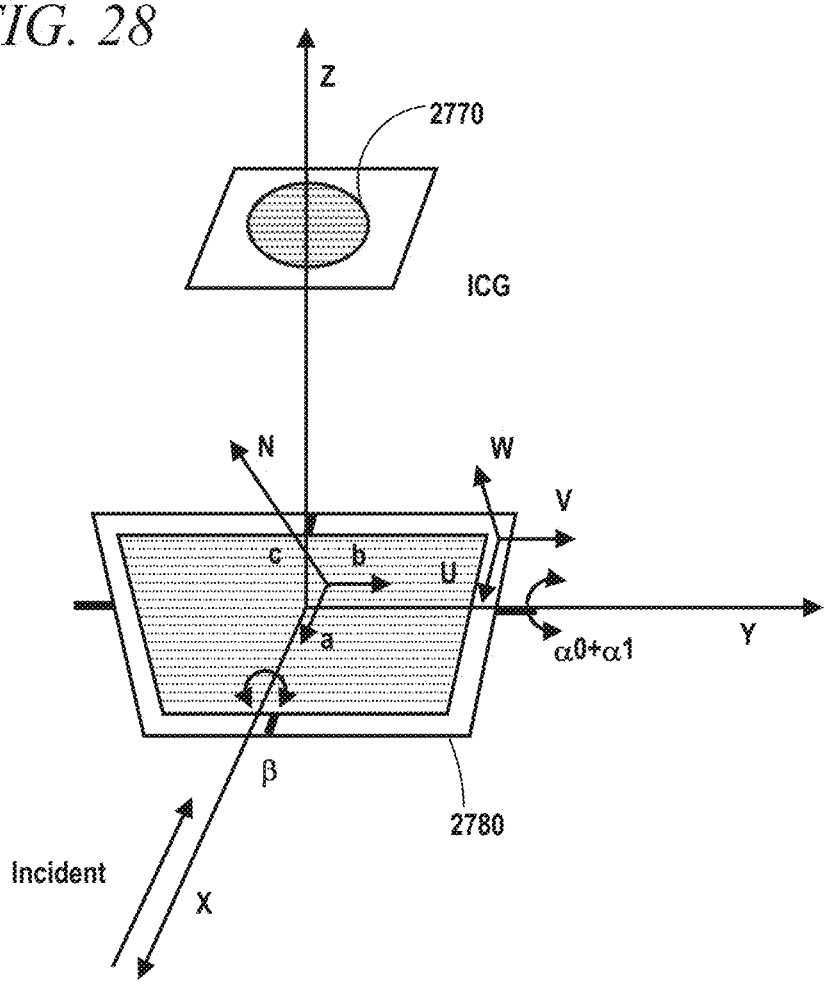
FIG. 28 includes a 3 space Cartesian coordinate system along with a representation of the scan mirror and an incoupling grating used in the system shown in FIG. 27 according to an embodiment of the invention.

Attention is now drawn to FIG. 28 which includes a 3 space Cartesian (X-Y-Z) coordinate system along with a representation of the scan mirror 2780 and ICG 2770 of the system 2700 shown in FIG. 27. The Cartesian coordinate system shown in FIG. 28 corresponds to the coordinate triad shown in FIG. 27. In the case illustrated in FIG. 28 which is merely exemplary of a range of possible set ups, an incident beam (e.g., the beam arriving from the QWP 2764) is propagating in the −X direction. The scan mirror 2780 includes inner gimbal pivot points 2802 which allows the scan mirror 2780 to rotate by an angle indicated as β relative to a frame 2804. The frame 2804 is supported by outer gimbal pivot points 2806 which allow the entire frame 2804 to rotate. The axis of rotation about the inner gimbal pivot points 2802 is orthogonal to the axes of rotation about the outer gimbal pivot points 2806. The rotation about the outer gimbal pivot points 2806 is described by an angle α0+α1, where α0 corresponds to a median rest position of the frame 2804 and α1 corresponds to a deviation from α0. Rotation about the inner gimbal pivot points 2802 described by β may be referred to as 'roll', and rotation about the outer gimbal pivot points 2806 described by α0+α1 may be referred to as 'pitch'. Gratings 2776, 2778 are schematically illustrated on the surface of the scan mirror 2780 as a series of horizontal lines, although the actual structure as mentioned above and as further described below is more complex.

Figure 29:
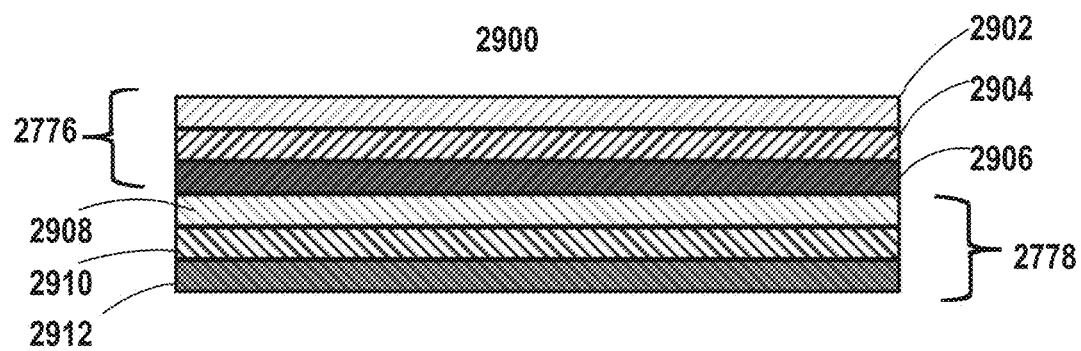
FIG. 29 is a schematic illustration of a six layer polarization responsive liquid crystal grating that may be used on a scan mirror in the system shown in FIG. 27 according to an embodiment of the invention.

FIG. 29 is a schematic illustration of a six layer polarization responsive liquid crystal grating stack 2900 that is used on a scan mirror in the system shown in FIG. 27 according to an embodiment of the invention. The stack 2900 includes the LH reflective liquid crystal gratings 2776 and the RH reflective liquid crystal gratings 2778. The LH reflective liquid crystal gratings 2776 includes a LH red reflective layer 2902, a LH green reflective layer 2904 and a LH blue reflective layer 2906. Similarly the RH reflective liquid crystal gratings 2778 include a RH red reflective layer 2908, a RH green reflective layer 2910, and a RH blue reflective layer 2912. The LH reflective liquid crystal gratings 2776 will interact with the LH polarized RGB light beam components received from the QWP 2764 and the RH reflective liquid crystal gratings 2778 will interact with the RH polarized RGB light beam components received from the QWP.

Each of the layers 2902, 2904, 2906, 2908, 2910, and 2912 suitably has a structure like the blue ICG 1814 shown in FIGS. 19-20 but with a Z axis pitch (referring to coordinate system of FIG. 19) chosen to match the wavelength of the light with which it is intended to work, and a lateral pitch selected to diffracted light to either a first or second FOV portion.

As will be described further below different grating pitches are chosen for the layers 2902, 2904, 2906, 2908, 2910, and 2912 so that the LH reflective liquid crystal gratings 2776 will illuminate a first portion of the FOV of the system 2700 and the RH reflective liquid crystal gratings 2778 will illuminate a second portion of the FOV of the system 2700 that is adjacent to the first portion of the FOV. The deflection of light rays by a reflective grating can be described by equation 1 below:

$$I \times \overline{N} = \overline{D} \times \overline{N} + \Lambda G \qquad \text{EQU. 1}$$

where I is the incident ray vector;
N is a unit length vector normal to the surface of the grating
D is the diffracted ray vector
G is a unit length vector in the plane of the grating parallel to the lines of the grating; and
Λ is the grating parameter and is given by equation 2 below:

$$\Lambda = \frac{m \lambda_0}{d_g} \qquad \text{EQU. 2}$$

where m is the diffraction order (e.g., 1),
$\lambda_0$ is the free space wavelength of light;
$d_g$ is the grating line pitch.

The dependence of the diffracted ray vector D on the wavelength $\lambda_0$ can be addressed by selecting the value of $d_g$ such that within each of the LH reflective LC grating sets 2776 and RH reflective grating sets 2778, the same ratio $\lambda_0/d_g$ is used for the RGB layers but different values of the ratio $\lambda_0/d_g$ are used in the two sets 2776, 2778. In this way the RGB components within each portion of the field of view will be aligned.

Equation 1 can be broken down into three (X, Y, and Z) component equations and a supplemental normalization equation that sets the Euclidean length of the diffracted ray vector D to unity magnitude can be used in combination with two of the aforementioned component equations to solve for the X, Y and Z vector components of the diffracted ray vector D (labeled Dx, Dy, Dz) in terms of the normal vector N which is specified by the pitch angle α0+α1 and the roll angle β. (Based on values of α0+α1 and β the normal vector N and the grating vector G can be transformed to the U-V-W coordinate system and in turn to the X-Y-Z coordinate system) Referring to the X-Y-Z coordinate system in FIGS. 27 and 28, some chosen value of Dx, for example Dx=0.0 can be chosen as a boundary between two portions of the FOV to be illuminated, respectively, by the two gratings sets 2776, 2778. The normal vector N can be set based on the minimum and maximum extreme values of α1 and a chosen value of β (e.g., zero or an extreme value), and in each case (minimum and maximum value of α1) equation 1 can be solved for $\lambda_0/d_g$ so as to obtain two values of $\lambda_0/d_g$. One value of $\lambda_0/d_g$ will be used for the LH reflective LC reflective grating set 2776 and the other value of $\lambda_0/d_g$ will be used for the RH reflective grating set 2778. Within each of the gratings sets 2776, 2778 the value of $d_g$ will be changed for each layer 2902-2912 according to the value of $\lambda_0$ for each layer 2902-2912 (i.e., based on its design for one of the R, G, or B color components).

According to an alternative embodiment one of the grating sets 2776, 2778 is replaced with a liquid crystal reflector (which in the context of grating terminology can be referred to as a 0-order reflector). Such an alternative liquid crystal reflector will have a vertical pitch (Pitch_Z in FIG. 19), but no lateral periodicity (Pitch_Y in FIG. 19). Such an alternative is consistent with the above described methodology-for determining $\lambda_0/d_g$ in the case that one extreme value of $\alpha 0+\alpha 1$ is equal to 45°.

Figure 30:
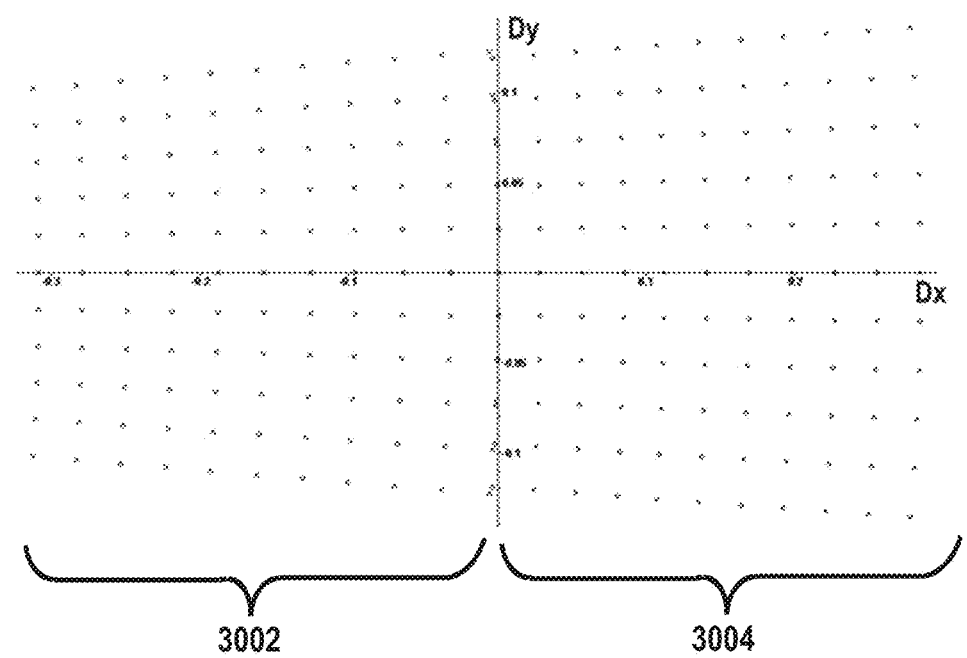
FIG. 30 is a graph including scan angles in two regions, each attributed to a different polarization state, that is produced by the system shown in FIG. 27 using the multi-layer selective liquid crystal grating shown in FIG. 29 according to an embodiment of the invention.

FIG. 30 is a graph 3000 including scan angles in two portions of a total field of view, each attributed to a different polarization state that is produced by the system 2700 shown in FIG. 27 using the multilayer selective liquid crystal grating 2900 shown in FIG. 29 according to an embodiment of the invention. The horizontal axis of the graph indicates the value of the X component (denoted Dx) of rays diffracted by the six layer stack 2900 and the vertical axis indicates the Y component (denoted Dy) of rays diffracted by the six layer stack 2900. A first portion 3002 of the FOV of the system 2700 is approximately to the right of the vertical axis of FIG. 30 and a second portion 3004 of the FOV of the system 2700 is approximately to the left of the vertical axis of FIG. 30, although there is some slight curvature of the boundary between the two portions 3002, 3004. Diffracted rays in the first portion 3002 are represented by circle plot symbols and diffracted rays in the second portion 3004 are represented by square plot symbols. Each portion 3002, 3004 individually corresponds to the full range of the variable part of pitch angle $\alpha 1$ and the roll angle $\beta$ of the scan mirror. The left portion 3002 may for example be produced by the LH reflective LC gratings 2776 (which will have one value of $\lambda_0/d_g$) diffracting LH polarized light received from the QWP 2764, while the right portion 3004 may for example be produced by the RH reflective LC gratings 2778 (which will have another value of $\lambda_0/d_g$). The values of $\lambda_0/d_g$ will be determined as previously described. Alternatively the association of the handedness and the values of $\lambda_0/d_g$ may be interchanged.

Thus by the provision of the LH reflective liquid crystal gratings 2776 and the RH reflective liquid crystal gratings 2778 to establish separate regions of the FOV, one need not increase the mechanical scan range of the scan mirror 2776, which would typically be done at the expense of the attainable line frequency and vertical resolution or frame rate. Thus a relatively high FOV, frame rate and vertical resolution can be attained in one system.

Figure 31:
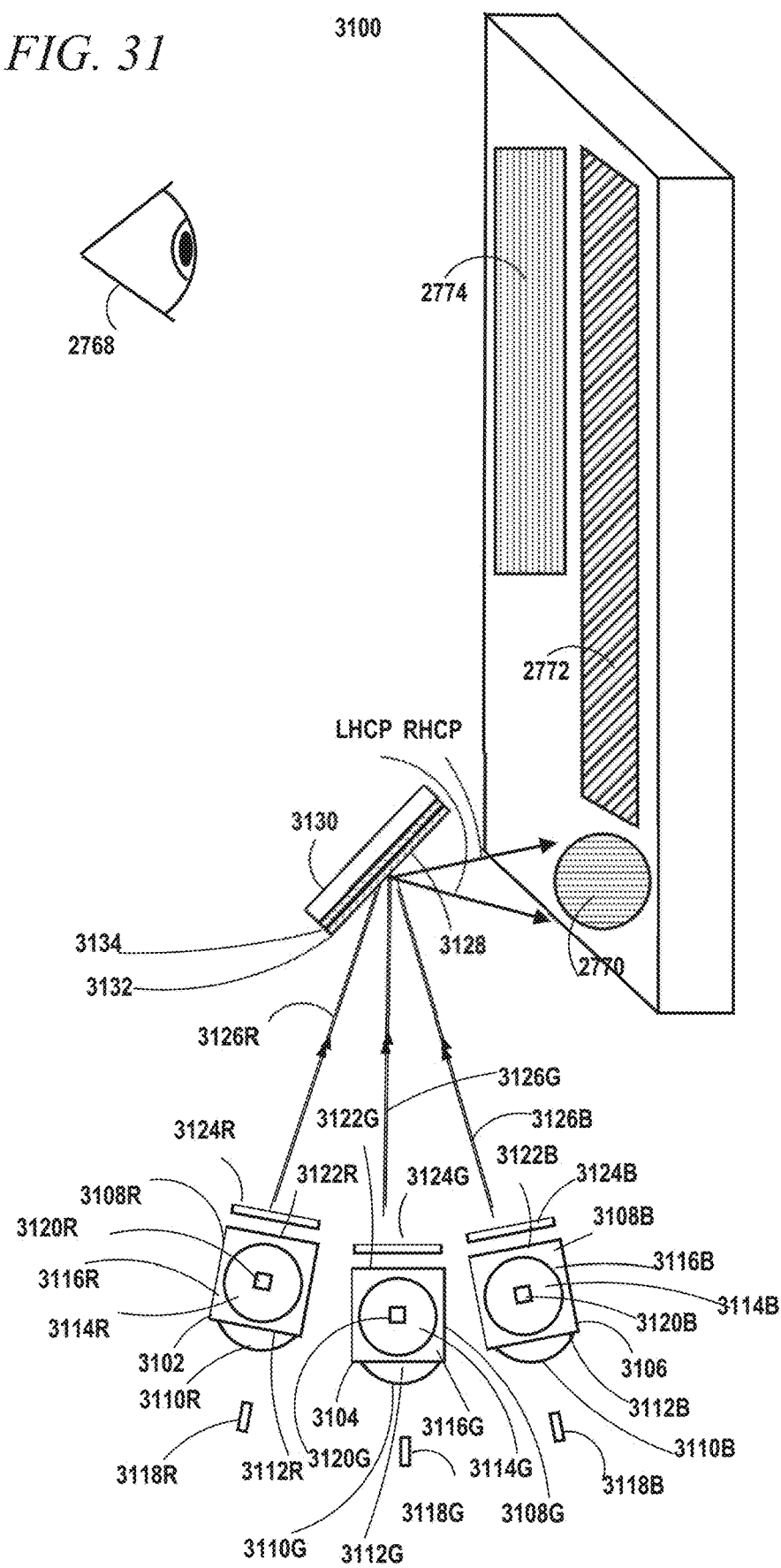
FIG. 31 is a schematic illustration of a waveguide display system that may be used in augmented reality glasses according to an embodiment of the invention.

FIG. 31 is a schematic illustration of a waveguide display system 3100 that may be used in augmented reality glasses according to an embodiment of the invention. Referring to FIG. 31, the system 3100 includes a red light engine 3102, green light engine 3104 and a blue light engine 3106. To the extent that the three light engines 3102, 3104 3106 have the same construction with the exception of the substitution of appropriately colored laser diodes in each, only the construction of the red light engine 3102 will be described in detail. The reference numerals for the component parts of the red light engine will include a letter 'R' suffix, and the equivalent components in the green light engine 3104 and the blue light engine 3106 will have a letter 'G' suffix and a letter 'B' suffix respectively.

The red light engine 3102 includes a polarization beam splitter 3108R (in this instance used as a polarization beam combiner), which has a structure like the PBS 2702 shown in FIG. 27 including an polarization selective reflector which is not distinguishable in the perspective of FIG. 31. A p-polarized light collimating lens 3110R is positioned proximate a p-polarized light input face 3112R of the PBS 3108R and an s-polarized light collimating lens 3114R is positioned proximate an s-polarized light input face 3116R of the PBS 3108. A p-polarized red laser diode 3118R is positioned facing the p-polarized collimating lens 3110R and the p-polarized light input face 3112R and similarly an s-polarized red laser diode 3120R is positioned facing the s-polarized light collimating lens 3114R and the s-polarized light input face 3116R. The PBS 3108R serves to combine s-polarized light and p-polarized light that has been emitted by the p-polarized red laser diode 3118R and the p-polarized red laser diode 3120R into a single beam that is emitted at an output face 3122R of the PBS 3108R. After passing through the output face 3122R the light from the laser diodes 3118R, 3120R passes through a quarter wave plate (QWP) 3124R which converts the p-polarized light and s-polarized light to two different circularly polarized light states RHCP light and LHCP light, forming a combined RHCP and LHCP red light beam 3126R. Either assignment between linear polarized states and circular polarized states can be used, and the choice is implemented by rotating the QWP 3124R. The red laser diodes 3118R, 3120 will be separately modulated based on red channel information from separate but adjacent portions of a total field of view of the system 3100. Accordingly the RHCP light and the LHCP light will be imagewise modulated based on pixel information from the separate but adjacent portions of the FOV of the system 3100.

The red RHCP and LHCP light beam 3126R, a green RHCP and LHCP light beam 3126G and a blue RHCP and LHCP light beam 3126B are incident on a surface 3128 of a 2-D scan mirror 3130. Superposed LH reflective liquid crystal grating 3132 and RH reflective liquid crystal grating 3134 are disposed on the surface 3128 of the 2-D scan mirror 3130. The LH reflective liquid crystal grating 3132 will deflect the LHCP light to a first solid angle range corresponding to a first portion of the FOV of the system 3100 while the RH reflective liquid crystal grating 3134 will deflect the RHCP light to a second solid angle range corresponding to a second portion of the FOV of the system 3100 which is substantially non-overlapping the first portion of the FOV. Light reflected by the liquid crystal gratings 3132, 3134 will enter the ICG 2770 and propagate to the user eye position 2768 as previously described in the context of the FIG. 27. In contrast to the embodiment shown in FIG. 27, in the embodiment shown in FIG. 31 the LH and RH reflective liquid crystal gratings 3132, 3134 include one layer that handles all three R, G, and B color components. Higher birefringence liquid crystal materials can be used to achieve broader reflectance bands. However to compensate for the fact that the grating pitch $d_g$ cannot be set separately for each color, the three light engines 3102, 3104, 3106 are oriented such that the three RHCP and LHCP composite beams are angularly separated. The purpose is to compensate for wavelength dependence of the diffraction angles in order to have the fields of view of the three (RGB) color channels more closely aligned than would be the case if all three color components arrived at the scan mirror 3130 in parallel beams.

According to an alternative embodiments rather than using polarization beam splitters 3108R, 3108G, 3108B, the p-polarized and s-polarized laser diodes 3118R, 3118G, 3118B, 3120R, 3120G, 3120B are positioned side-by-side facing the 2-D scan mirror 3130 through one or more collimating lenses.

In some embodiments, the method includes providing two or more RGB (Red-Green-Blue) combiners disposed on an opposite side of the waveguide from the scanning mirror and configured to provide the two or more light beams having different incident angles. The method further includes configuring an input coupling optic element in the waveguide to allow the input light beams to pass through the wave guide to reach the scanning mirror, and is configured to couple the reflected light beams into the waveguide.

In some embodiments, the method also includes disposing the two or more RGB combiners at different angles with respect to the scanning mirror to provide the two or more incoming light beams having different incident angles.

In some embodiments, the method also includes disposing the two or more RGB combiners at the same angle with respect to the scanning mirror, and providing reflective optical elements to direct the two or more light beams towards the scanning mirror at different incident angles.

In some embodiments, the method also includes providing two or more RGB combiners disposed on the same side of the waveguide as the scanning mirror. The two or more RGB combiners provide the two or more light beams having different incident angles. A quarter wave plate is disposed adjacent to the scanning mirror, and a polarization sensitive beam splitter is disposed between the quarter wave plate and the waveguide. The polarization sensitive beam splitter is configured to direct the two or more light beams from the RGB combiners mirror through the quarter wave plate towards the scanning mirror. Light beams reflected from the scanning mirror are configured to propagate through the quarter wave plate and the polarization sensitive beam splitter and be coupled into the waveguide by the input coupling diffractive optic element.

In some embodiments, a method for providing a composite field of view (FOV) includes providing a collimated incoming light beam including multiple incoming light beams, and providing a scanning mirror with a diffractive surface for receiving the collimated incoming light beam and for providing a plurality of reflected light beams having different angles of incidence. Each of the plurality of reflected light beams is configured to provide an image in a respective field of view (FOV). The method also includes receiving the plurality of reflected light beams in a waveguide, and projecting a plurality of output light beams from the waveguide to form a projected image in a composite field of view (FOV). In some embodiments, the multiple incoming light beams comprise light beams having different wavelengths. In some embodiments, the multiple incoming light beams comprise light beams having different polarizations.

In some embodiments, a method for providing a composite field of view (FOV) includes field of view field of view providing a collimated incoming light beam, which includes multiple incoming light beams. The method also includes providing a scanning mirror with a diffractive surface for receiving the collimated incoming light beam and for providing a plurality of reflected light beams in different directions, each of the plurality of reflected light beams configured to provide an image in a respective field of view (FOV). The method also includes configuring a waveguide for in-coupling the plurality of reflected light beams with different incident angles that are greater than a total internal reflection (TIR) critical angle. The plurality of reflected light beams undergo total internal reflection in the waveguide and is projected from the waveguide through an output coupling optical element to form a corresponding plurality of fields of view. The method also includes forming a composite FOV including the plurality of fields of view.

In some embodiments, a method for providing a composite field of view (FOV) includes providing a collimated incoming light beam, which includes multiple incoming light beams. The method includes providing a scanning mirror with a diffractive surface for receiving the collimated incoming light beam and for providing a plurality of reflected light beams. Each of the plurality of reflected light beams has different angles of reflection and configured to provide an image in a respective field of view (FOV). The method also includes configuring a waveguide for in-coupling the plurality of reflected light beams with different incident angles at an input coupling optical element. The plurality of reflected light beams undergo total internal reflection in the waveguide and is projected from the waveguide through an output coupling optical element to form a corresponding plurality of fields of view. The method further includes forming a composite FOV including the plurality of fields of view.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. An image display system, comprising:
   an optical subsystem configured to emit a first imagewise modulated light beam and a second imagewise modulated light beam, wherein the first imagewise modulated light beam illuminates a first portion of a composite field of view (FOV) and the second imagewise modulated light beam illuminates a second portion of the composite field of view, wherein the composite field of view comprises the first portion and the second portion to form a tiled image in an enlarged composite field of view;
   a scanning mirror positioned to reflect the first imagewise modulated light beam at a first angle and the second imagewise modulated light beam at a second angle different from the first angle; and
   a waveguide, having:
      at least one diffractive input coupling optical element for diffracting the first imagewise modulated light beam and the second imagewise modulated light beam from the scanning mirror into the waveguide to propagate in the waveguide by total internal reflection (TIR); and
      an output coupling optical element for projecting a plurality of output light beams derived from the first imagewise modulated light beam and the second imagewise modulated light beam from the waveguide to illuminate the tiled image in the enlarged composite field of view.

2. The image display system of claim 1 wherein:
   the optical subsystem is disposed on an opposite side of the waveguide from the scanning mirror.

3. The image display system of claim 2 wherein:
   the at least one diffractive input coupling optical element is positioned between the optical subsystem and the scanning mirror such that the first imagewise modulated light beam and the second imagewise modulated light beam emitted from the optical subsystem pass through the at least one diffractive input coupling optical element before reaching the scanning mirror.

4. The image display system of claim 3 further comprising a polarization control element positioned between the optical subsystem and the at least one diffractive input coupling optical element such that the first imagewise modulated light beam and the second imagewise modulated light beam pass through the polarization control element before reaching the at least one diffractive input coupling optical element.

5. The image display system of claim 4 wherein the at least one diffractive input coupling optical element is a polarization selective device.

6. The image display system of claim 5 wherein the optical subsystem is configured to produce the first imagewise modulated light beam and the second imagewise modulated light beam in a linearly polarized state and the polarization control element comprises a waveplate that is configured to convert the first imagewise modulated light beam and the second imagewise modulated light beam to at least one circularly polarized light state and the at least one diffractive input coupling optical element is polarization selective in that the at least one diffractive input coupling optical element is selective on the basis of handedness of circularly polarized light.

7. The image display system of claim 5 wherein the at least one diffractive input coupling optical element comprises a diffraction grating that includes a cholesteric liquid crystal.

8. The image display system of claim 7 wherein the at least one diffractive input coupling optical element further comprises an alignment layer that establishes a periodic lateral variation in an alignment direction of the cholesteric liquid crystal.

9. The image display system of claim 1 wherein the optical subsystem comprises:
   a first three color channel modulated light source that is configured to produce the first imagewise modulated light beam; and
   a second three color channel modulated light source that is configured to produce the second imagewise modulated light beam.

10. The image display system of claim 9 wherein:
    the first three color channel modulated light source comprises a first red laser, a first green laser, and a first blue laser; and
    the second three color channel modulated light source comprises a second red laser, a second green laser and a second blue laser.

11. The image display system of claim 10 wherein:
    the first three color channel modulated light source comprises a first dichroic beam combiner optically coupled to the first red laser, the first green laser and the first blue laser; and
    the second three color channel modulated light source comprises a second dichroic beam combiner optically coupled to the second red laser, the second green laser and the second blue laser.

12. The image display system of claim 1 wherein the optical subsystem is configured to emit the first imagewise modulated light beam at a first angle and to emit the second imagewise modulated light beam at a second angle, the second angle being different than the first angle.

13. The image display system of claim 12 wherein the optical subsystem is configured to emit the first imagewise modulated light beam along a first path and to emit the second imagewise modulated light beam along a second path that intersects the first path at the scanning mirror, the second path being different than the first path.

14. The image display system of claim 1 wherein the optical subsystem is configured to emit the first imagewise modulated light beam collinear with the second imagewise modulated light beam.

15. The image display system of claim 1 further comprising a polarizer and a wave plate wherein the optical subsystem and the scanning mirror are disposed on a common side of the waveguide along with the polarizer and the wave plate and wherein a first optical path segment from the optical subsystem to the scanning mirror extends from the optical subsystem to the polarizer and from the polarizer through the wave plate and a second optical path segment from the scanning mirror to the at least one diffractive input coupling optical element traverses the wave plate and the polarizer.

16. The image display system of claim 1, wherein the at least one diffractive input coupling optical element comprises a first input coupling grating and a second input coupling grating, and wherein the output coupling optical element comprises an output coupling grating.

17. The image display system of claim 1 wherein the first portion of the composite field of view is interleaved with the second portion of the composite field of view.

18. A method for providing a composite field of view (FOV), comprising:
    providing a collimated incoming light beam including a plurality of components;
    providing a scanning mirror with a diffractive surface for receiving the collimated incoming light beam and for separating the plurality of components into a plurality of reflected light beams having different angles of diffraction, each of the plurality of reflected light beams configured to provide a portion of the composite field of view;
    diffracting the plurality of reflected light beams into an eyepiece waveguide to propagate in the eyepiece waveguide by total internal reflection (TIR); and
    outputting a plurality of output light beams from the eyepiece waveguide to form a projected image in the composite field of view, wherein the plurality of output light beams are derived from the plurality of reflected light beams.

19. The method of claim 18, wherein the plurality of components comprises components that are differentiated by wavelength.

20. The method of claim 18, wherein the plurality of components comprises components that are differentiated by polarization state.

* * * * *